United States Patent
Chang et al.

(10) Patent No.: US 9,282,335 B2
(45) Date of Patent: Mar. 8, 2016

(54) SYSTEM AND METHOD FOR CODING IMAGE FRAMES

(75) Inventors: Nelson Liang An Chang, Corvallis, OR (US); Niranjan Damera-Venkata, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2624 days.

(21) Appl. No.: 11/741,864

(22) Filed: Apr. 30, 2007

(65) Prior Publication Data

US 2008/0267516 A1 Oct. 30, 2008

(51) Int. Cl.
| | |
|---|---|
| H04N 19/00 | (2014.01) |
| H04N 19/186 | (2014.01) |
| H04N 19/597 | (2014.01) |
| H04N 19/50 | (2014.01) |
| H04N 13/04 | (2006.01) |

(52) U.S. Cl.
CPC ............. *H04N 19/186* (2014.11); *H04N 19/50* (2014.11); *H04N 19/597* (2014.11); *H04N 13/0459* (2013.01)

(58) Field of Classification Search
USPC ........ 382/100, 232, 236; 713/150; 380/28, 54
See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck et al. | |
| 4,747,146 A * | 5/1988 | Nishikawa et al. ........... 382/112 |
| 4,807,031 A * | 2/1989 | Broughton et al. ........... 348/460 |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,309,241 A | 5/1994 | Hoagland | |
| 5,317,409 A | 5/1994 | Macocs | |
| 5,386,253 A | 1/1995 | Fielding | |
| 5,402,184 A | 3/1995 | O'Grady et al. | |
| 5,490,009 A | 2/1996 | Venkateswar et al. | |
| 5,557,353 A | 9/1996 | Stahl | |
| 5,689,283 A | 11/1997 | Shirochi | |
| 5,751,379 A | 5/1998 | Markandey et al. | |
| 5,842,762 A | 12/1998 | Clarke | |
| 5,870,136 A | 2/1999 | Fuchs et al. | |
| 5,897,191 A | 4/1999 | Clarke | |

(Continued)

FOREIGN PATENT DOCUMENTS

| | | | |
|---|---|---|---|
| EP | 1001306 | 5/2000 | |
| WO | WO 2004109380 A1 * | 12/2004 | ............ G02F 1/3357 |

OTHER PUBLICATIONS

Raskar et al., "The Office of the Future: A Unified Approach to Image-Based Modeling and Spatially Immersive Displays", Computer Graphics Proceedings, 1998, pp. 1-10.

(Continued)

*Primary Examiner* — Bernard Krasnic

(74) *Attorney, Agent, or Firm* — Dicke, Billig & Czaja, PLLC

(57) ABSTRACT

A method including modifying at least a first pixel value in a first portion of a first image frame to create a first difference between the first pixel value in the first image and a first pixel value in a first portion of a second image frame that, at least in part, represents a first code and providing the first image frame and the second image frame to a display device for display at different times is provided.

5 Claims, 8 Drawing Sheets

(56) References Cited

U.S. PATENT DOCUMENTS

| | | |
|---|---|---|
| 5,912,773 A | 6/1999 | Barnettei et al. |
| 5,920,368 A | 7/1999 | Eriksson |
| 5,953,148 A | 9/1999 | Moseley et al. |
| 5,978,518 A | 11/1999 | Oliyide et al. |
| 6,025,951 A | 2/2000 | Swart et al. |
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,313,888 B1 | 11/2001 | Tabata |
| 6,317,171 B1 | 11/2001 | Dewald |
| 6,384,816 B1 | 5/2002 | Tabata |
| 6,390,050 B2 | 5/2002 | Feikus |
| 6,393,145 B2 | 5/2002 | Betrisey et al. |
| 6,522,356 B1 | 2/2003 | Watanabe |
| 6,545,685 B1 | 4/2003 | Dorbie |
| 6,570,623 B1 | 5/2003 | Li et al. |
| 6,657,603 B1 | 12/2003 | Demetrescu et al. |
| 6,823,455 B1 * | 11/2004 | Macy et al. ............ 713/176 |
| 6,877,857 B2 | 4/2005 | Perlin |
| 6,963,319 B2 | 11/2005 | Pate et al. |
| 7,114,071 B1 * | 9/2006 | Chmounk et al. ............ 713/164 |
| 2003/0020809 A1 | 1/2003 | Gibbon et al. |
| 2003/0076325 A1 | 4/2003 | Thrasher |
| 2003/0090597 A1 | 5/2003 | Katoh et al. |
| 2003/0107712 A1 | 6/2003 | Perlin |
| 2004/0136528 A1 * | 7/2004 | Muratani ............ 380/37 |
| 2004/0239885 A1 | 12/2004 | Jaynes et al. |
| 2005/0287449 A1 | 12/2005 | Matthys et al. |
| 2006/0012598 A1 | 1/2006 | Tsao |
| 2006/0029252 A1 | 2/2006 | So |
| 2006/0187299 A1 | 8/2006 | Miyazawa |
| 2007/0153025 A1 * | 7/2007 | Mitchell et al. ............ 345/690 |
| 2007/0165024 A1 | 7/2007 | Tsao |
| 2007/0285351 A1 | 12/2007 | Willis |

OTHER PUBLICATIONS

Cotting et al., "Adaptive Instant Displays: Continuously Calibrated Projections Using Per-Pixel Light Control", Eurographics 2005, vol. 24, No. 3.

Grundhofer et al., "Coded Projection and Illumination for Television Studios", Eurographics 2007, vol. 26, No. 3.

Cotting et al., "Embedding Imperceptible Patterns into Projected Images for Simultaneous Acquisition and Display", IEEE Computer Society, 0-7695-21912-6/04 (2004).

Elliott, et el. "Color Subpixel Rendering Projectors and Flat Panel Displays", Feb. 27-Mar. 1, 2003, SMPTE Advanced Motion Imaging Conference, pp. 1.4.

Chen, Diana C. "Display resolution enhancement with optical scanners." Applied Optics 40, No. 5 (2001): 636-643.

Yasuda, et al., "FLC wobbling for high-resolution projectors," Journal of the Society for Information Display 5, No. 3 (1997) 299-305.

Kelley, Dh, "Motion end Vision—ll. Stabilized Spatio-Temporal Threshold Surface", Journal of the Optical Society of America, vol. 60, No. 10, Oct. 1979.

Tokita, et al,. "P-108: FLC Resolution-Enhancing Device for Projection Displays", SID 02 Digest 2002, pp. 638-641.

Jaynes, et al., "Super-resolution composition in multi-projector displays," 10/2003, IEEE Int'l Workshop on Projector-Camera Systems. vol. 8.

Chen, et al., "Visual Resolution Limits for Color Matrix Displays", 1992, Displays, vol. 13, No. 4, pp. 221-226.

* cited by examiner

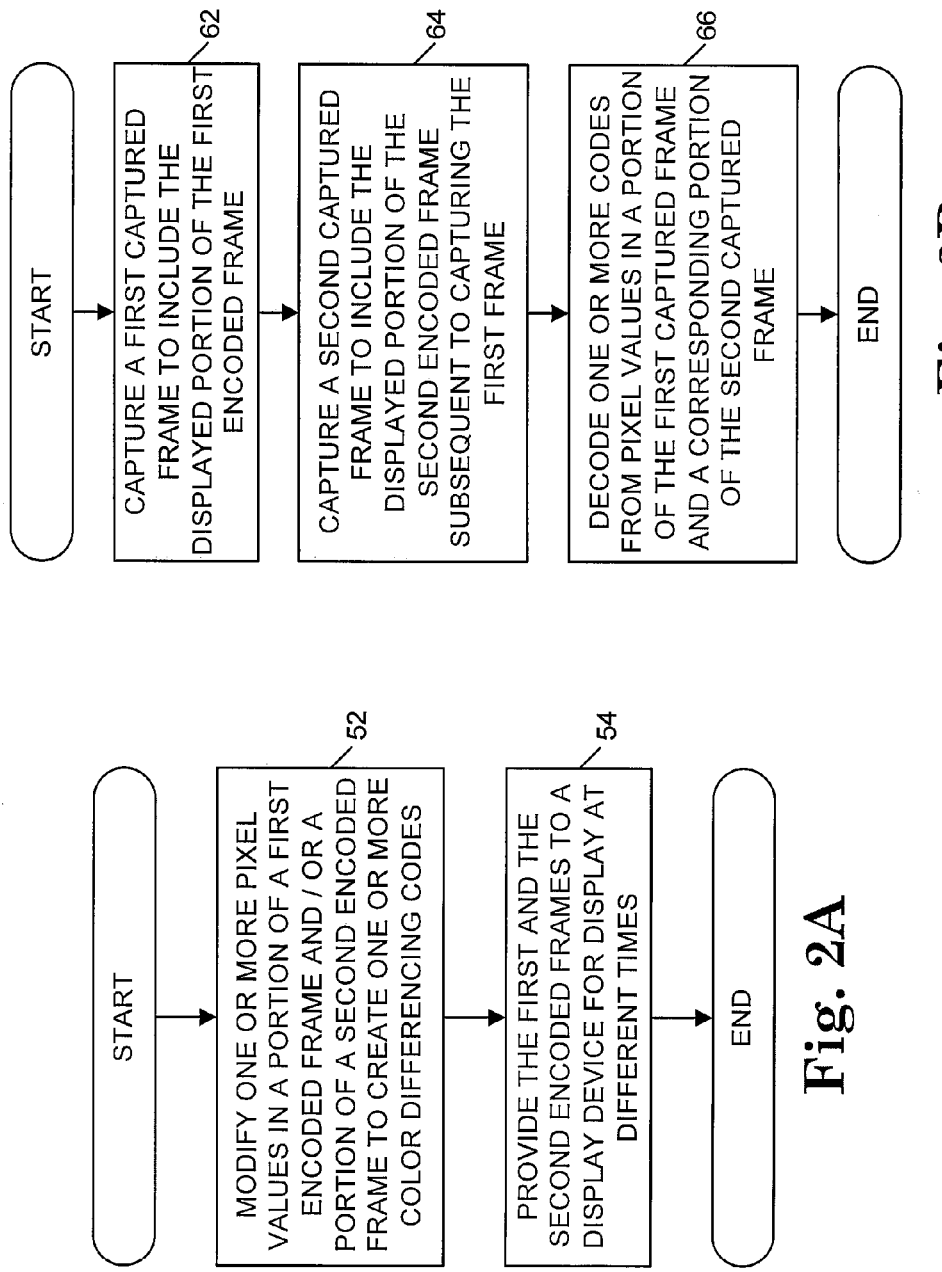

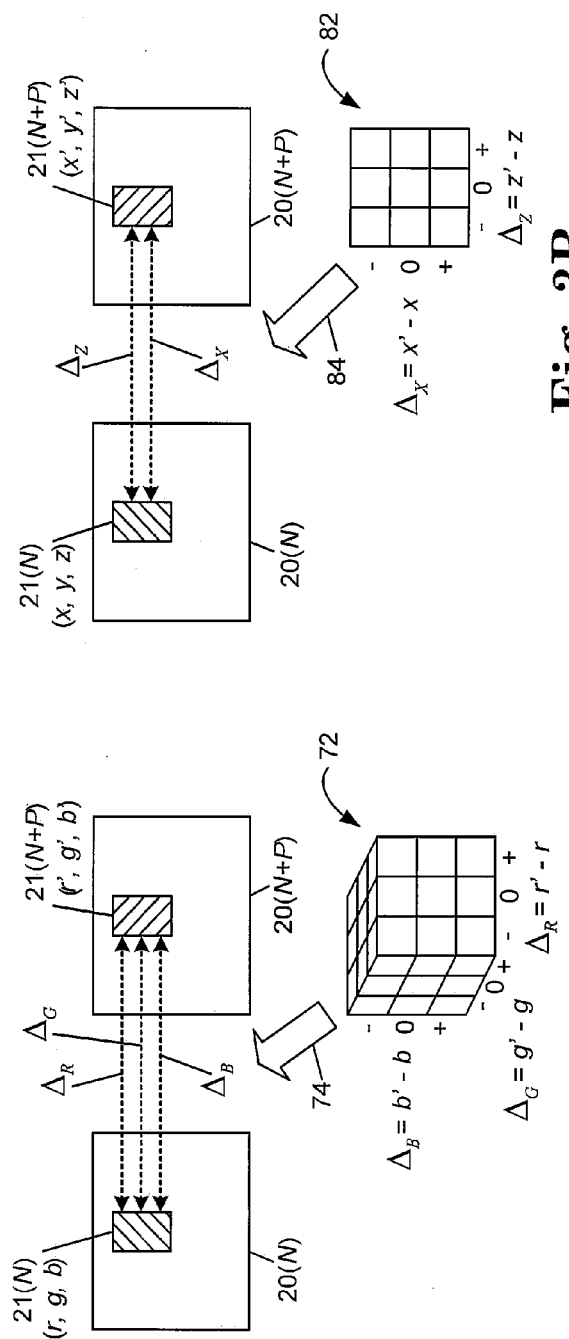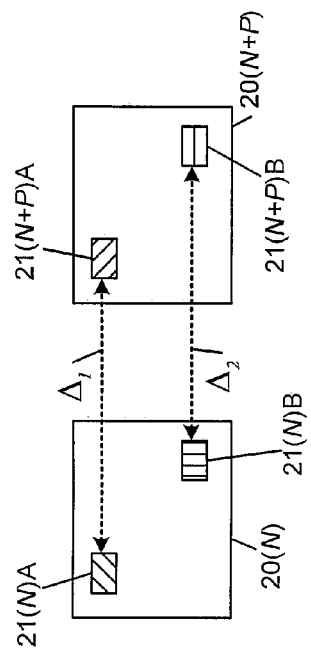
Fig. 3A
Fig. 3B
Fig. 4

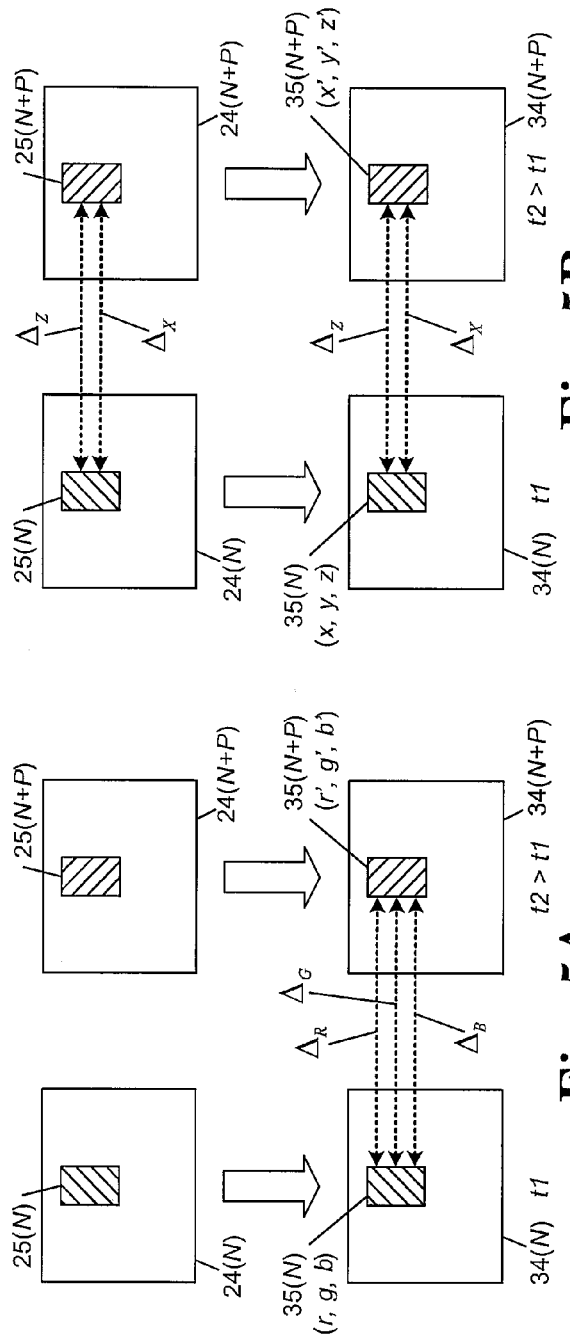
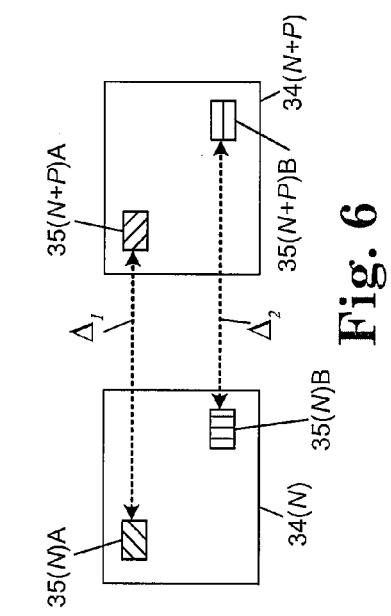
Fig. 5A
Fig. 5B
Fig. 6
Fig. 7

SYSTEM AND METHOD FOR CODING IMAGE FRAMES

CROSS-REFERENCE TO RELATED APPLICATION

This application is related to U.S. patent application Ser. No. 11/080,583, filed Mar. 15, 2005, and entitled PROJECTION OF OVERLAPPING SUB-FRAMES ONTO A SURFACE; and U.S. patent application Ser. No. 11/080,223, filed Mar. 15, 2005, and entitled PROJECTION OF OVERLAPPING SINGLE-COLOR SUB-FRAMES ONTO A SURFACE. These applications are incorporated by reference herein.

BACKGROUND

In display systems, such as digital light processor (DLP) systems and liquid crystal display (LCD) systems, it is often desirable to include information in displayed images that is usable by the display system or another electronic device. With many display systems, however, information that is added into displayed images for use by display systems may be seen by a viewer. The information may detract from the viewer's enjoyment of the displayed images. It would be desirable to be able to include information in visual images formed by a display system where the information is imperceptible by a viewer.

SUMMARY

According to one embodiment, a method including modifying at least a first pixel value in a first portion of a first image frame to create a first difference between the first pixel value in the first image and a first pixel value in a first portion of a second image frame that, at least in part, represents a first code and providing the first image frame and the second image frame to a display device for display at different times is provided.

BRIEF DESCRIPTION OF THE DRAWINGS

FIGS. 2A-2B are flow charts illustrating embodiments of methods for encoding information into image frames and decoding information from captured frames.

FIGS. 3A-3B are block diagrams illustrating embodiments of encoding information into image frames.

FIG. 4 is a block diagram illustrating one embodiment of encoding information into image frames.

FIGS. 5A-5B are block diagrams illustrating embodiments of decoding information from image frames.

FIG. 6 is a block diagram illustrating one embodiment of decoding information from image frames.

FIG. 7 is a block diagram illustrating one embodiment of encoding information into image frames.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system and method for coding image frames is provided. The system and method contemplate forming functions based at least in part on color differences in visual content by modifying content in corresponding portions of images frames and displaying the image frames with the modified content. Images are captured of the modified content in the displayed images, and the color differencing codes are detected by searching for the color differencing codes in the captured images. The color differencing codes may be formed in the image frames so that they are imperceptible or substantially visually imperceptible by a viewer of the displayed images.

The color differencing codes may be used for geometric calibration within a display system. The color differencing codes may also be used by other processing systems to perform other suitable functions such as forensic marking or watermarking content.

Figure 1:
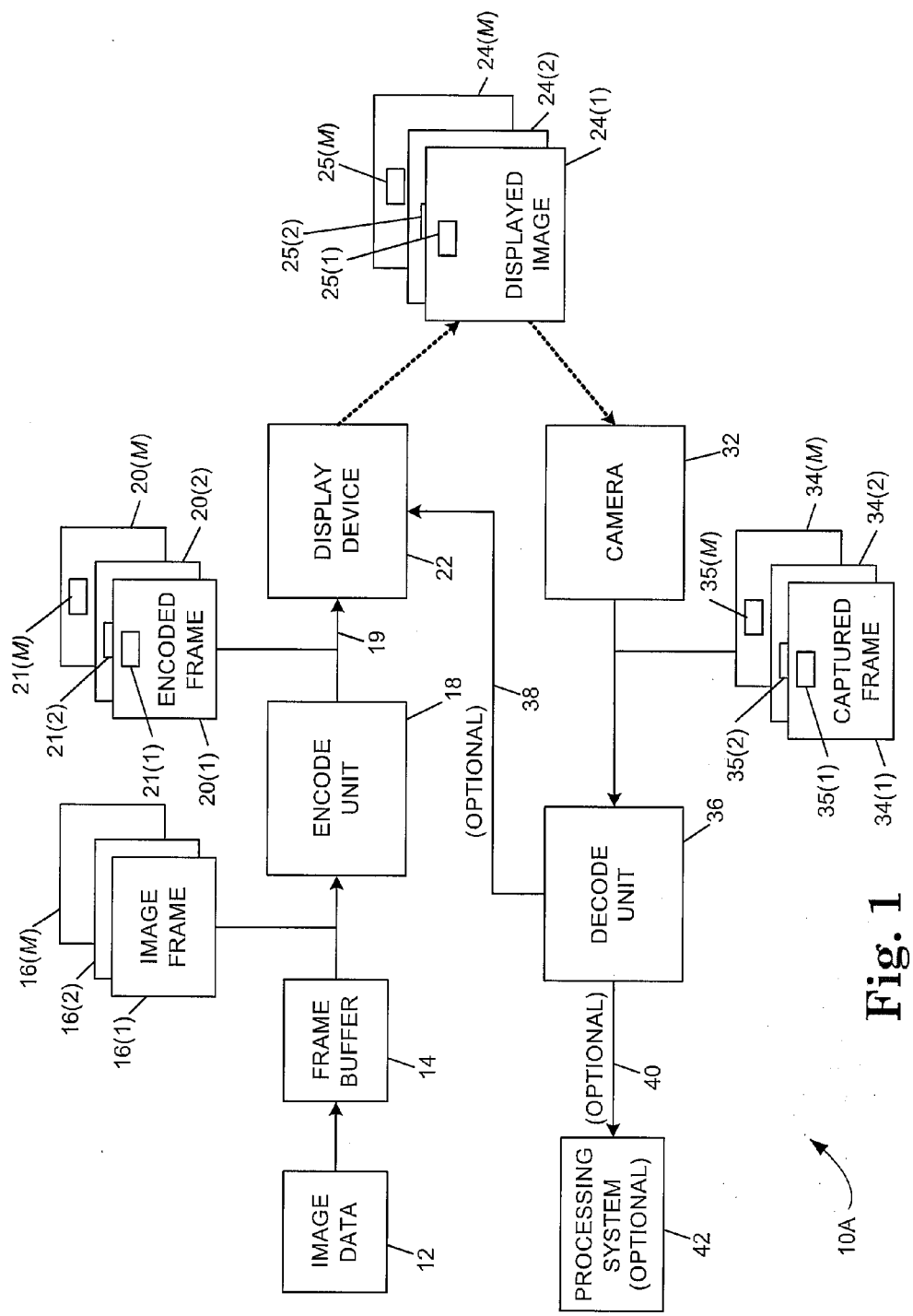
FIG. 1 is a block diagram illustrating one embodiment of an image display system.

I. Color Differencing Codes in Images Frames for Display in Non-Overlapping Images FIG. 1 is a block diagram illustrating one embodiment of an image display system 10A configured to encode information into image frames, display the image frames, and decode information from images captured from the displayed frames.

Image display system 10A processes image data 12 into a set of image frames 16(1)-16(M), where M is an integer that is greater than or equal to one, and generates corresponding displayed images 24(1)-24(M). Image data 12 may be read from a storage media (e.g., a hard disk drive or a DVD) (not shown), streamed over a network (not shown), received from an image capture source (e.g., a camera) (not shown), or otherwise provided to image display system 10A. An image frame buffer 14 receives and buffers image data 12 to create image frames 16. An encode unit 18 processes image frames 16(1)-16(M) from buffer 14 to define corresponding encoded frames 20(1)-20(M) with encoded portions 21(1)-21(M) and provides encoded frames 20(1)-20(M) to a display device 22 across a connection 19.

Display device 22 receives encoded frames 20(1)-20(M) and stores encoded frames 20(1)-20(M) in a frame buffer (not shown). Display device 22 displays encoded frames 20(1)-20(M) with corresponding encoded portions 21(1)-21(M) onto a display surface (not shown) to produce displayed images 24(1)-24(M) with corresponding displayed encoded portions 25(1)-25(M) for viewing by a user.

Display system 10A includes at least one camera 32 configured to capture images 34(1)-34(M) to include encoded portions 35(1)-35(M) that correspond to encoded portions 25(1)-25(M) in displayed images 24(1)-24(M) on the display surface. Camera 32 includes any suitable image capture device or devices configured to capture at least encoded portions 25 of displayed images 24 from the display surface. Camera 32 may include a single sensor in one embodiment.

A decode unit 36 analyzes encoded portions 35 of captured images 34 to decode information that was encoded into encoded portions 21 of encoded frames 20 by encode unit 18. Decode unit 36 optionally provides the decoded information to display device 22 as indicated by an optional connection 38 and/or an optional processing system 42 as indicated by an optional connection 40. Display device 22, decode unit 36, and/or processing system 42 may perform operations based on the content of the decoded information as described in additional detail below.

The process of encoding information into frames 20 will now be described with reference to FIGS. 1, 2A, 3A-3B, and 4.

Encode unit 18 encodes information into image frames 20 by forming one or more color differencing codes in encoded frames 20. Each code is encoded as difference between corresponding pixel values in at least two portions 21 of at least two encoded frames 20. Depending on a coding scheme that is implemented, the magnitude of the difference may be constant or may vary between different color channels, different pixel locations, and/or different time instances. The predetermined magnitudes may be determined or adjusted empirically or statistically by accumulating a standard deviation map (not shown) for each color channel from known patterns that are displayed by display device 22 and captured by camera 32.

As an example, encode unit 18 may encode a code as a difference between a pixel value in portion 21(1) of encoded frame 20(1) and a corresponding pixel value in portion 21(2) of encoded frame 20(2). In one embodiment, encode unit 18 forms the difference into one of three possible states: positive, negative, or neutral. The difference may be positive (i.e., the pixel value in portion 21(1) is greater than the pixel value in portion 21(2) by a predetermined magnitude), negative (i.e., the pixel value in portion 21(1) is less than the pixel value in portion 21(2) by a predetermined magnitude), or neutral (i.e., the pixel value in portion 21(1) is approximately equal to or within a predetermined range of the pixel value in portion 21(2)).

In other embodiments, additional thresholds may also be defined so that the difference may represent more than three states. For example, encode unit 18 may encode the difference to be strongly positive (i.e., the pixel value in portion 21(1) is greater than the pixel value in portion 21(2) by a first predetermined magnitude), weakly positive (i.e., the pixel value in portion 21(1) is greater than the pixel value in portion 21(2) by a second predetermined magnitude that is less than the first predetermined magnitude), neutral, weakly negative, or strongly negative by using two positive predetermined magnitudes and two negative predetermined magnitudes.

Portions 21 that encode each code may each be a single pixel, a contiguous set of two or more pixels, or a disjointed set of two or more pixels in encoded frames 20. A set of two or more corresponding portions 21 that encodes a code is configured such that each portion 21 is displayed at the same location on a display surface (not shown) (i.e., encoded portions 25 in displayed images 24) at different times when displayed by display device 22. The set of portions 21 may be included in a continuous set of encoded frames 20 (i.e., frames 20 that are adjacent to one another in time such as frames 20(1) and 20(2)) or in a discontinuous set of encoded frames 20 (i.e., frames 20 that are not adjacent to one another in time such as frames 20(1) and 20(3)).

Accordingly, each code may be decoded by examining the difference between encoded portions 25 in at least two displayed images 24 where encoded portions 25 are displayed at the same location on a display surface by displayed device 22. In the example above, a code may be decoded by examining the difference between encoded portion 25(1), which corresponds to encoded portion 21(1), and encoded portion 25(2), which corresponds to encoded portion 21(2).

FIG. 2A is a flow chart illustrating an embodiment of a method for encoding information into encoded frames 20. The method of FIG. 2A may be performed by encode unit 18.

In FIG. 2A, encode unit 18 modifies one or more pixel values in a portion 21 of a first encoded frame 20 (e.g., portion 21(1) in encode frame 20(1)) and/or a portion 21 of a second encoded frame 20 (e.g., portion 21(2) in encode frame 20(2)) to create a color differencing code as indicated in a block 52. For example, encode unit 18 may increase or decrease a pixel value in portion 21(1) to form a desired difference (e.g., a positive, negative, or neutral difference) from a corresponding pixel value in portion 21(2) where the difference represents the code. Encode unit 18 may also increase or decrease each of the pixel values in portions 21(1) and 21(2) to form the desired difference.

Encode unit 18 modifies the pixel values in encoded portions 21 so that the difference between the modified pixel values and the original pixel values is sufficient to allow for detection of the code by decode unit 36 but is visually imperceptible or substantially visually imperceptible by a viewer when encoded frames 20 are displayed by display device 22. To do so, encode unit 18 modifies the pixel values so that the modified values of one or more portions 21 are within a range of pixel values that are indistinguishable or substantially indistinguishable to a viewer. In one embodiment, the range of values may be larger for high frequency content than low frequency content to ensure that the codes are visually imperceptible by a viewer. Encode unit 18 may account for pixel values in portions 21 that are a zero (i.e., minimum) or a saturation (i.e., maximum) value or near a zero or saturation value by modifying pixel values in corresponding portions 21 that are non-zero or not at or near the saturation value. Encode unit 18 may also account for pixel values in portions 21 that are a zero or a saturation value or by modifying both the zero or saturation value and pixel values in corresponding portions 21.

In one embodiment illustrated in FIG. 3A, encode unit 18 modifies pixel values in one or more of red, green, and blue color channels of encoded frames 20. FIG. 3A illustrates an example of portions 21(N) and 21(N+P) in encoded frames 20(N) and 21(N+P) that have red, green, and blue color channels, where N is greater than or equal to one, N is less than P, P is less than or equal to M, and the difference between P and N is greater than or equal to one. Portion 21(N) has values of r, g, and b for the red, green, and blue color channels, respectively, and portion 21 (N+P) has values of r', g', and b' for the red, green, and blue color channels, respectively.

In the example of FIG. 3A, encode unit 18 forms codes using differences $\Delta_R$, $\Delta_G$, and $\Delta_B$ for the red, green, and blue color channels, respectively. As noted above, the magnitude of these differences may be the same or different for each of the red, green, and blue color channels. In addition, the magnitude of these differences may vary for different portions of encoded frames 20(N) and 21(N+P) and may vary over time.

To encode portions 21(N) and 21(N+P), encode unit 18 modifies the r, g, and b values of portion 21(N) and/or the r', g', and b' values of portion 21(N+P) so that a difference, $\Delta_R$, between pixel values r' and r is positive (+), negative (−), or neutral (0), a difference, $\Delta_G$, between pixel values g' and g is positive (+), negative (−), or neutral (0), and a difference, $\Delta_B$, between pixel values b' and b is positive (+), negative (−), or neutral (0).

By using each of the three color channels in this embodiment, encode unit 18 may encode one of 26 possible codes using the possible state combinations of $\Delta_R$, $\Delta_G$, and $\Delta_B$ (i.e., [(3 $\Delta_R$ states)×(3 $\Delta_G$ states)×(3 $\Delta_B$ states)]−[1 state that may be difficult to detect where $\Delta_R$=0, $\Delta_G$=0, and $\Delta_B$=0]) as shown in a possible states graph 72 and indicated by an arrow 74. For example, a first code may be encoded as the combination of $\Delta_R$=+, $\Delta_G$=+, and $\Delta_B$=+, and a second code may be encoded as the combination of $\Delta_R$=+, $\Delta_G$=−, and $\Delta_B$=0. In other embodiments, encode unit 18 may form codes using fewer than all three color channels.

Since the human visual system is sensitive to even subtle changes in intensity or luminance, it may be preferred to preserve this component and operate only in the less sensitive chrominance space. In one embodiment illustrated in FIG. 3B, encode unit 18 modifies pixel values in one or more chrominance channels of encoded frames 20. In this embodiment, encode unit 18 modifies chrominance values in a luminance-chrominance color space (e.g., XYZ and YCrCb). Encode unit 18 or another processing unit (not shown) may convert image frames 16 from one color space (e.g., RGB) to a luminance-chrominance color space prior to generating encoded frames 20 in this embodiment.

FIG. 3B illustrates an example of portions 21(N) and 21(N+P) in encoded frames 20(N) and 21(N+P) that have luminance (i.e., Y) and chrominance (i.e., X and Z) color channels, where N and P are defined as above in FIG. 3A. Portion 21(N) has values of x, y, and z for the chrominance, luminance, and chrominance channels, respectively, and portion 21(N+P) has values of x', y', and z' for the chrominance, luminance, and chrominance channels, respectively. y and y' may be approximately equal.

In the example of FIG. 3B, encode unit 18 forms codes using differences $\Delta_X$ and $\Delta_Z$ for the two chrominance channels, respectively. As noted above, the magnitude of these differences may be the same or different for each of the chrominance channels. In addition, the magnitude of these differences may vary for different portions of encoded frames 20(N) and 21(N+P) and may vary over time.

To encode portions 21(N) and 21(N+P), encode unit 18 modifies the x, y, and z values of portion 21(N) and/or the x', y', and z' values of portion 21(N+P) so that a difference, $\Delta_X$, between chrominance values x' and x is positive (+), negative (−), or neutral (0) and a difference, $\Delta_Z$, between chrominance values z' and z is positive (+), negative (−), or neutral (0).

By using both of the chrominance channels in this embodiment, encode unit 18 may encode one of 8 possible codes using the possible state combinations of $\Delta_X$ and $\Delta_Z$ (i.e., [(3 $\Delta_X$ states)×(3 $\Delta_Z$ states]−[1 indeterminate state (i.e., $\Delta_X$=0 and $\Delta_Z$=0)]) as shown in a possible states graph 82 and indicated by an arrow 84. For example, a first code may be encoded as the combination of $\Delta_X$=+ and $\Delta_Z$=+, and a second code may be encoded as the combination of $\Delta_X$=− and $\Delta_Z$=0. In other embodiments, encode unit 18 may form codes using only one chrominance channel.

In other embodiments, color spaces other than the red, green, and blue color space and luminance-chrominance color spaces may be used to encode color differencing codes.

In each of the above examples in FIGS. 3A and 3B, encode unit 18 may encode additional unique codes using additional portions 21 in additional encoded frames 20. For example, encode unit 18 may encode a first part of a code into portions 21(N) and 21(N+P) and a second part of the code into portion 21(N+P) and a corresponding portion 21(N+P+Q) (not shown) in an encoded frame 20(N+P+Q) (not shown) where Q is greater than P and a difference between Q and P is greater than or equal to one. Any number of additional parts of a single code may be encoded using corresponding numbers of additional portions 21 in additional encoded frames 20.

Encode unit 18 may also be configured to encode more than one code into each set of encoded frames 20. Encode unit 18 may further be configured to encode a single code using two or more portions 21 in each encoded frame 20. These embodiments are illustrated with reference to FIG. 4 where encoded frame 20(N) includes portions 21(N)A and 21(N)B, encoded frame 21(N+P) includes portions 21(N+P)A and 21(N+P)B, and N and P are defined as above in FIGS. 3A and 3B.

In one embodiment, encode unit 18 encodes a first code into portions 21(N)A and 21(N+P)A and a second, unrelated code into portions 21(N)B and 21(N+P)B using one or more of RGB or chrominance color channels as described above with reference to FIGS. 3A and 3B. In this embodiment, a difference, $\Delta_1$, encodes the first code where $\Delta_1$ represents the combined difference in the color channels of portions 21(N)A and 21(N+P)A and a difference, $\Delta_2$, encodes the second code where $\Delta_2$ represents the combined difference in the color channels of portions 21(N)B and 21(N+P)B. Any suitable number of additional codes may be encoded in encoded frames 20(N) and 20(N+P) using additional corresponding portions 21(N) and 21(N+P) (not shown) in other embodiments.

In another embodiment, encode unit 18 encodes a first part of a code into portions 21(N)A and 21(N+P)A and a second part of the code into portions 21(N)B and 21(N+P)B using one or more of RGB or chrominance color channels as described above with reference to FIGS. 3A and 3B. In this embodiment, a difference, $\Delta_1$, encodes the first part of the code where $\Delta_1$ represents the combined difference in the color channels of portions 21(N)A and 21(N+P)A and a difference, $\Delta_2$, encodes the second part of the code where $\Delta_2$ represents the combined difference in the color channels of portions 21(N)B and 21(N+P)B. The differences, $\Delta_1$ and $\Delta_2$, combine to represent the code in this embodiment. In an embodiment where $\Delta_1$ and $\Delta_2$ include red, green, and blue color channels as in the example of FIG. 3A, encode unit 18 may encode up to 676 (i.e., 26×26) unique codes using $\Delta_1$ and $\Delta_2$. In an embodiment where $\Delta_1$ and $\Delta_2$ include two chrominance channels as in the example of FIG. 3B, encode unit 18 may encode up to 64 (i.e., 8×8) unique codes using $\Delta_1$ and $\Delta_2$. Any number of additional parts of a single code may be encoded using corresponding numbers of additional portions 21(N) and 21(N+P) in additional encoded frames 20(N) and 20(N+P).

Although shown as disjointed in the example of FIG. 4, portions 21(N)A and 21(N)B may also be contiguous in encoded frame 20(N) and/or portions 21(N+P)A and 21(N+P)B may also be contiguous in encoded frame 20(N+P) in the above embodiments.

In one embodiment, encode unit 18 forms overlapping spatial groupings (e.g., 2×2 regions) of color differencing codes in portions 21 of encoded frame 20. Where 2×2 regions are used, encode unit 18 may form 358,800 (i.e., 26!/(26−4)!) unique codes using three color channels (e.g., red, green, and blue color channels) or 1,680 (i.e., 8!/(8−4)!) unique codes using two color channels (i.e., X and Z chrominance channels). The spatial groupings may be rotation independent and/or phase dependent.

Subsequent to forming color differencing codes in encoded frames 20, encode unit 18 provides encoded frames 20 to display device 22 for display at different times as indicated in a block 54. Display device 22 successively displays encoded frames 20 to form successively displayed images 24 on a display surface (not shown). Displayed images 24 include encoded portions 25 that correspond to encoded portions 21 of encoded frames 20.

The process of decoding information from frames 34 will now be described with reference to FIGS. 1, 2B, 5A-5B, and 6.

Decode unit 36 decodes information from captured frames 34 by detecting one or more color differencing codes in two or more captured frames 34. Camera 32 captures captured frames 34 to include displayed portions 25 of displayed images 24 that correspond to encoded portions 21 of encoded frames 20. Camera 32 may also be precalibrated so that decode unit 36 may detect the color differencing codes at least in part from the spectral properties of the camera sensor (not shown) of camera 32.

As described above, each code is encoded as difference between corresponding pixel values in at least two portions 21 of at least two encoded frames 20 and the magnitude of the difference may be constant or may vary between different color channels, different pixel locations, and/or different time instances. Decode unit 36 includes or otherwise accesses decoding information (not shown) that indicates the magnitude of the difference of the color differencing codes for each color channel, pixel location, and/or different time instance for captured frames 34. The decoding information may or may not specify regions of captured frames 34 for decode unit 36 to examine to detect color differencing codes.

As an example, decode unit 36 may decode a code from a difference between a pixel value in portion 35(1) of captured frame 34(1) and a corresponding pixel value in portion 35(2) of captured frame 34(2). In one embodiment, the difference may be positive (i.e., the pixel value in portion 35(1) is greater than the pixel value in portion 35(2) by a predetermined magnitude), negative (i.e., the pixel value in portion 35(1) is less than the pixel value in portion 35(2) by a predetermined magnitude), or neutral (i.e., the pixel value in portion 35(1) is approximately equal to or within a predetermined range of the pixel value in portion 35(2)).

Portions 35 that include each code may each be a single pixel, a contiguous set of two or more pixels, or a disjointed set of two or more pixels in captured frames 34. A set of two or more corresponding portions 35 that include a code may be included in a continuous set of captured frames 34 (i.e., frames 34 that are adjacent to one another in time such as frames 34(1) and 34(2)) or in a discontinuous set of captured frames 34 (i.e., frames 34 that are not adjacent to one another in time such as frames 34(1) and 34(3)).

FIG. 2B is a flow chart illustrating an embodiment of a method for decoding information from captured frames 34. The method of FIG. 2B may be performed by decode unit 36 in combination with camera 32.

In FIG. 2B, camera 32 captures a first captured frame 34 to include one or more displayed portions 25 of a first encoded frame 20 as indicated in a block 62. In examples shown in FIGS. 5A and 5B, camera 32 capture frame 34(N) with a captured portion 35(N) to include displayed portion 25(NV) of displayed frame 24(N) where displayed portion 25(N) corresponds to portion 21(N) of encoded frame 20(N) (shown in FIGS. 3A and 3B). Camera 32 also captures a second captured frame 34 to include one or more displayed portions 25 of a second encoded frame 20 subsequent to capturing the first captured frame 34 as indicated in a block 64. In FIGS. 5A and 5B, camera 32 captures frame 34(N+P) with a captured portion 35(N+P) to include displayed portion 25(N+P) of displayed frame 24(N+P) where displayed portion 25(N+P) corresponds to portion 21(N+P) of encoded frame 20(N+P) (shown in FIGS. 3A and 3B).

Decode unit 36 decodes one or more color differencing codes from pixel values in a portion 35 of the first captured frame 34 and a portion 35 of the second captured frame 34 as indicated in a block 66. Decode unit 36 identifies color differencing codes in captured frames 34 by detecting positive, negative, or minimal differences between corresponding pixel values in captured frames 34 that are equal to or exceed a predetermined magnitude for a pixel location or locations, a color channel, or time instance. Decode unit 36 determines whether each pixel value in one captured image 34 is greater than or less than a corresponding pixel value in another captured image 34 by a predetermined magnitude or equal to the corresponding pixel value in another captured image 34. Where the differences between corresponding pixel values are approximately equal to a predetermined magnitude or are close to zero, decode unit 36 identifies a color differencing code.

In one embodiment illustrated in FIG. 5A, decode unit 36 decodes color differencing codes from pixel values in one or more of red, green, and blue color channels of captured frames 34. FIG. 5A illustrates an example of portions 35(N) and 35(N+P) in captured frames 34(N) and 34(N+P) that have red, green, and blue color channels, where N and P are defined as above in FIG. 3A. Portion 35(N) has values of r, g, and b for the red, green, and blue color channels, respectively, and portion 35(N+P) has values of r', g', and b' for the red, green, and blue color channels, respectively.

In the example of FIG. 5A, decode unit 36 identifies codes from differences $\Delta_R$, $\Delta_G$, and $\Delta_B$ for the red, green, and blue color channels, respectively, in portions 35(N) and 35(N+P). As noted above, the magnitude of these differences may be the same or different for each of the red, green, and blue color channels. In addition, the magnitude of these differences may vary for different portions of captured frames 34(N) and 34(N+P) and may vary over time.

To decode portions 35(N) and 35(N+P), decode unit 36 determines whether a difference, $\Delta_R$, between pixel values r' and r exceeds a predetermined positive or negative threshold (i.e., + or −) or is approximately zero (i.e., 0), a difference, $\Delta_G$, between pixel values g' and g exceeds a predetermined positive or negative threshold (i.e., + or −) or is approximately zero (i.e., 0), and a difference, $\Delta_B$, between pixel values b' and b exceeds a predetermined positive or negative threshold (i.e., + or −) or is approximately zero (i.e., 0).

From each of the three color channels in this embodiment, decode unit 36 may decode one of 26 possible codes using the possible state combinations of $\Delta_R$, $\Delta_G$, and $\Delta_B$ (i.e., [(3 $\Delta_R$ states)×(3 $\Delta_G$ states)×(3 $\Delta_B$ states)]−[1 state that may be difficult to detect where $\Delta_R$=0, $\Delta_G$=0, and $\Delta_B$=0]) as shown in possible states graph 72 in FIG. 3A. For example, a first code may be decoded from the combination of $\Delta_R$=+, $\Delta_G$=+, and $\Delta_B$=+, and a second code may be decoded from the combination of $\Delta_R$=+, $\Delta_G$=−, and $\Delta_B$=0. In other embodiments, decode unit 36 may identify codes using fewer than all three color channels.

In one embodiment illustrated in FIG. 5B, decode unit 36 decodes color differencing codes from pixel values in one or more chrominance channels of captured frames 34. In this embodiment, decode unit 36 decodes color differencing codes from chrominance values in a luminance-chrominance color space (e.g., XYZ and YCrCb). Decode unit 36 or another processing unit (not shown) may convert captured frames 34 from one color space (e.g., RGB) to a luminance-chrominance color space prior to decoding color differencing codes in this embodiment.

FIG. 5B illustrates an example of portions 35(N) and 35(N+P) in captured frames 34(N) and 34(N+P) that have luminance (i.e., Y) and chrominance (i.e., X and Z) color channels, where N and P are defined as above in FIG. 3B. Portion 35(N) has values of x, y, and z for the chrominance, luminance, and chrominance channels, respectively, and portion 35(N+P) has values of x', y', and z' for the chrominance, luminance, and chrominance channels, respectively.

In the example of FIG. 5B, decode unit 36 identifies codes from differences $\Delta_X$ and $\Delta_Z$ for the two chrominance channels, respectively, in portions 35(N) and 35(N+P). As noted above, the magnitude of these differences may be the same or different for each of the chrominance channels. In addition, the magnitude of these differences may vary for different portions of captured frames 34(N) and 34(N+P) and may vary over time.

To decode portions 35(N) and 35(N+P), decode unit 36 determines whether a difference, $\Delta_X$, between chrominance values x' and x exceeds a predetermined positive or negative threshold (i.e., + or −) or is approximately zero (i.e., 0) and a difference, $\Delta_Z$, between chrominance values z' and z exceeds a predetermined positive or negative threshold (i.e., + or −) or is approximately zero (i.e., 0).

By using both of the chrominance channels in this embodiment, decode unit 36 may decode one of 8 possible codes using the possible state combinations of $\Delta_X$ and $\Delta_Z$ (i.e., [(3 $\Delta_X$ states)×(3 $\Delta_Z$ states]−[1 indeterminate state (i.e., $\Delta_X$=0 and $\Delta_Z$=0)]) as shown in possible states graph 82 in FIG. 3B. For example, a first code may be decoded from the combination of $\Delta_X$=+ and $\Delta_Z$=+, and a second code may be decoded from the combination of $\Delta_X$=− and $\Delta_Z$=0. In other embodiments, decode unit 36 may identify codes using only one chrominance channel.

In each of the above examples in FIGS. 5A and 5B, decode unit 36 may decode additional unique codes from additional portions 35 in additional captured frames 34. For example, decode unit 36 may decode a first part of a code from portions 35(N) and 35(N+P) and a second part of the code from portion 35(N+P) and a corresponding portion 35(N+P+Q) (not shown) in an captured frame 34(N+P+Q) (not shown) where Q is greater than P and a difference between Q and P is greater than or equal to one. Any number of additional parts of a single code may be decoded using corresponding numbers of additional portions 35 in additional captured frames 34.

Decode unit 36 may also be configured to decode more than one code from each set of captured frames 34. Decode unit 36 may further be configured to decode a single code from two or more portions 35 in each captured frame 34. These embodiments are illustrated with reference to FIG. 6 where captured frame 34(N) includes portions 35(N)A and 35(N)B, captured frame 34(N+P) includes portions 35(N+P)A and 35(N+P)B, and N and P are defined as above in FIGS. 5A and 5B.

In one embodiment, decode unit 36 decodes a first code from portions 35(N)A and 35(N+P)A and a second, unrelated code from portions 35(N)B and 35(N+P)B using one or more of RGB or chrominance color channels as described above with reference to FIGS. 5A and 5B. In this embodiment, a difference, $\Delta_1$, forms the first code where $\Delta_1$ represents the combined difference in the color channels of portions 35(N)A and 35(N+P)A and a difference, $\Delta_2$, forms the second code where $\Delta_2$ represents the combined difference in the color channels of portions 35(N)B and 35(N+P)B. Any suitable number of additional codes may be decoded from captured frames 34(N) and 34(N+P) using additional corresponding portions 35(N) and 35(N+P) (not shown) in other embodiments.

In another embodiment, decode unit 36 decodes a first part of a code from portions 35(N)A and 35(N+P)A and a second part of the code from portions 35(N)B and 35(N+P)B using one or more of RGB or chrominance color channels as described above with reference to FIGS. 5A and 5B. In this embodiment, a difference, $\Delta_1$, forms the first part of the code where $\Delta_1$ represents the combined difference in the color channels of portions 35(N)A and 35(N+P)A and a difference, $\Delta_2$, forms the second part of the code where $\Delta_2$ represents the combined difference in the color channels of portions 35(N)B and 35(N+P)B. The differences, $\Delta_1$ and $\Delta_2$, combine to represent the code in this embodiment. In an embodiment where $\Delta_1$ and $\Delta_2$ include red, green, and blue color channels as in the example of FIG. 5A, decode unit 36 may decode up to 676 (i.e., 26×26) unique codes using $\Delta_1$ and $\Delta_2$. In an embodiment where $\Delta_1$ and $\Delta_2$ include two chrominance channels as in the example of FIG. 5B, decode unit 36 may decode up to 64 (i.e., 8×8) unique codes using $\Delta_1$ and $\Delta_2$. Any number of additional parts of a single code may be encoded using corresponding numbers of additional portions 35(N) and 35(N+P) in additional captured frames 34(N) and 34(N+P).

Although shown as disjointed in the example of FIG. 6, portions 35(N)A and 35(N)B may also be contiguous in captured frame 34(N) and/or portions 35(N+P)A and 35(N+P)B may also be contiguous in captured frame 34(N+P) in the above embodiments.

In one embodiment, decode unit 36 decodes color differencing codes from overlapping spatial groupings (e.g., 2×2 regions) of portions 35 of captured frames 35. Where 2×2 regions are used, decode unit 36 may detect 358,800 (i.e., 26!/(26−4)!) unique codes using three color channels (e.g., red, green, and blue color channels) or 1,680 (i.e., 8!/(8−4)!) unique codes using two color channels (i.e., X and Z chrominance channels).

In one embodiment, decode unit 36 updates correspondence information between display device 22 and camera 32 using the color differencing codes identified by decode unit 36. One embodiment of the use of color differencing codes to update correspondence information will now be described with reference to FIG. 7 which is a block diagram illustrating one embodiment of encoding information into image frames.

In one embodiment, encode unit 18 forms 2×2 overlapping spatial groupings of color differencing codes in portions 21 of encoded frame 20 using two color channels (e.g., X and Z chrominance channels). In FIG. 7, 5×5 complementary coded subsets 99 and 100 of a portion 21 are shown using codes A through H. Each code A through H, represents a unique combination of positive, negative, or zero magnitude differences of the two color channels as described in additional detail above. Within each 5×5 coded subset 99 and 100, each 2×2 grouping 101 forms a unique code from the four codes A through H in that grouping so that each subset 99 and 100 forms a 4×4 array of 2×2 groupings in the display space of display device 22.

Decode unit 36 decodes each 2×2 grouping in subsets 99 and 100 from portions 35 of captured frames 34. Decode unit 36 determines the geometric mapping between display device 22 and camera 32 by identifying transitions and intersections between the 2×2 groupings to sub-pixel accuracy and corresponding the decoded sub-pixel coordinates in the camera space of camera 32 to those in the code arrangement defined in the display space of display device 22. The geometric mapping may be used directly as a vector field to map between the camera and projectors spaces or an appropriate parametric model may be applied to fit the mapping data.

In the above embodiments, image display system 10A may incorporate any suitable code redundancy and error correction algorithms to enhance the code robustness and validation process in system 10A. Decode unit 36 may, for robustness, evaluate the stability of the decoded information in space and/or time. For example, decode unit 36 may use an extended Kalman filter or probabilistic analysis to track the likelihood of the code's appearance.

In one embodiment, image display system 10A uses the color differencing codes for geometric calibration. To do so, image display system 10A updates correspondence information between display device 22, which displays encoded frames 20 as displayed images 24 on the display surface, and camera 32, which captures image 34 to include features 35 from display surface 26. Display device 22 may adjust geometric features of displayed images 24 using the correspondence information. The geometric features may include, for example, the size and shape of displayed images 24 on the display surface.

In this embodiment, a viewer of displayed images 24 does not see any fiducial marks in displayed images 24 because the "markings" used by image display system 10A to update the correspondence information are formed by the codes within displayed images 24. A simple pattern of codes may be used to create structured light patterns for correspondence estimation. Accordingly, the correspondence information of image display system 10A may be updated during normal operation without interrupting the viewing of displayed images 24.

In another embodiment, processing system 42 uses the color differencing codes to perform other suitable functions such as forensic marking or watermarking content to track or authenticate image data 12. In these embodiments, encode unit 18 may create temporal and/or spatial "signatures" based on the codes for more sophisticated applications including forensic marking and watermarking, etc. Moreover, encode unit 18 may also make "messages" consisting of a particular sequence of codes, etc.

In a further embodiment, image display system 10A uses the color differencing codes to allow a viewer to interact with system 10A. For example, camera 32, decode unit 36 and processing system 42 may be located in a remote control device that is configured to operate or otherwise function with display device 22.

In yet another embodiment, image display system 10A uses the color differencing codes to perform automatic keystone correction of display system 22.

In the embodiment of FIG. 1, image display system 10A generates displayed images 24 on a display surface such that displayed images 24 do not overlap or only partially overlap with other images on a display surface (not shown) of display device 22. For example, displayed images 24 may be the only images on the display surface or may be adjacent to, tiled with, or partially overlapping with other images (not shown) on the display surface. Displayed images 24 are defined to include any combination of pictorial, graphical, or textural characters, codes, illustrations, or other representations of information. Each displayed image 24 may form a still image that is displayed on the display surface or may be one of a set of successive images in a video stream that is displayed on the display surface.

In the embodiment of FIG. 1, image display system 10A includes hardware, software, firmware, or a combination of these. In one embodiment, one or more components of image display system 10A, such as encode unit 18 and/or decode unit 36, are included in a computer, computer server, or other microprocessor-based system capable of performing a sequence of logic operations. In addition, processing can be distributed throughout the system with individual portions being implemented in separate system components, such as in a networked or multiple computing unit environments.

Image frame buffer 14 includes memory for storing image data 12 for image frames 16. Thus, image frame buffer 14 constitutes a database of image frames 16. Examples of image frame buffer 14 include non-volatile memory (e.g., a hard disk drive or other persistent storage device) and may include volatile memory (e.g., random access memory (RAM)).

Encode unit 18 and decode unit 36 may be implemented in hardware, software, firmware, or any combination thereof. For example, encode unit 18 and/or decode unit 36 may include a microprocessor, programmable logic device, or state machine. Encode unit 18 and/or decode unit 36 may also form a program stored on one or more computer-readable mediums that is accessible and executable by a processing system (not shown). The term computer-readable medium as used herein is defined to include any kind of memory, volatile or non-volatile, such as floppy disks, hard disks, CD-ROMs, flash memory, read-only memory, and random access memory.

Encode unit 18, display device 22, decode unit 36, and/or camera 32 may each be integrated within image display system 10A as shown in FIG. 1 or may each be independent of image display system 10A. Accordingly, connection 19 and connections 38 and 40, if present, may each represent any suitable direct or indirect connection, whether wired or wireless, that may include one or more intermediate network and/or storage devices (not shown). Using connection 19, encode unit 18 and display device 22 may be in close proximity to one another or may be remotely located from one another. Similarly, decode unit 36 and display device 22 may be in close proximity to one another or may be remotely located from one another using connection 38, and decode unit 36 and processing system 42 may be in close proximity to one another or may be remotely located from one another using connection 40.

Display device 22 includes any suitable device or devices (e.g., a conventional projector, an LCD projector, a digital micromirror device (DMD) projector, a CRT display, an LCD display, or a DMD display) that are configured to display displayed image 24 onto or in a display surface. The surface 26 may be planar, non-planar, curved, or have any other suitable shape. In one embodiment, the display surface reflects light projected by display device 22 to form displayed images 24. In another embodiment, the display surface is translucent, and display system 10A is configured as a rear projection system.

In other embodiments, other display devices (not shown) may form images (not shown) on display surface 26 that overlap with displayed image 24. For example, display device 22 may be a portion of a hybrid display system with another type of display device that also displays images onto or in the display surface. In these embodiments, any images that would overlap with the display of portions 25 on the display surface may be configured not to interfere with the display of portions 25 on the display surface.

II. Color Differencing Codes in Images Frames for Display in Overlapping Images

Figure 8:
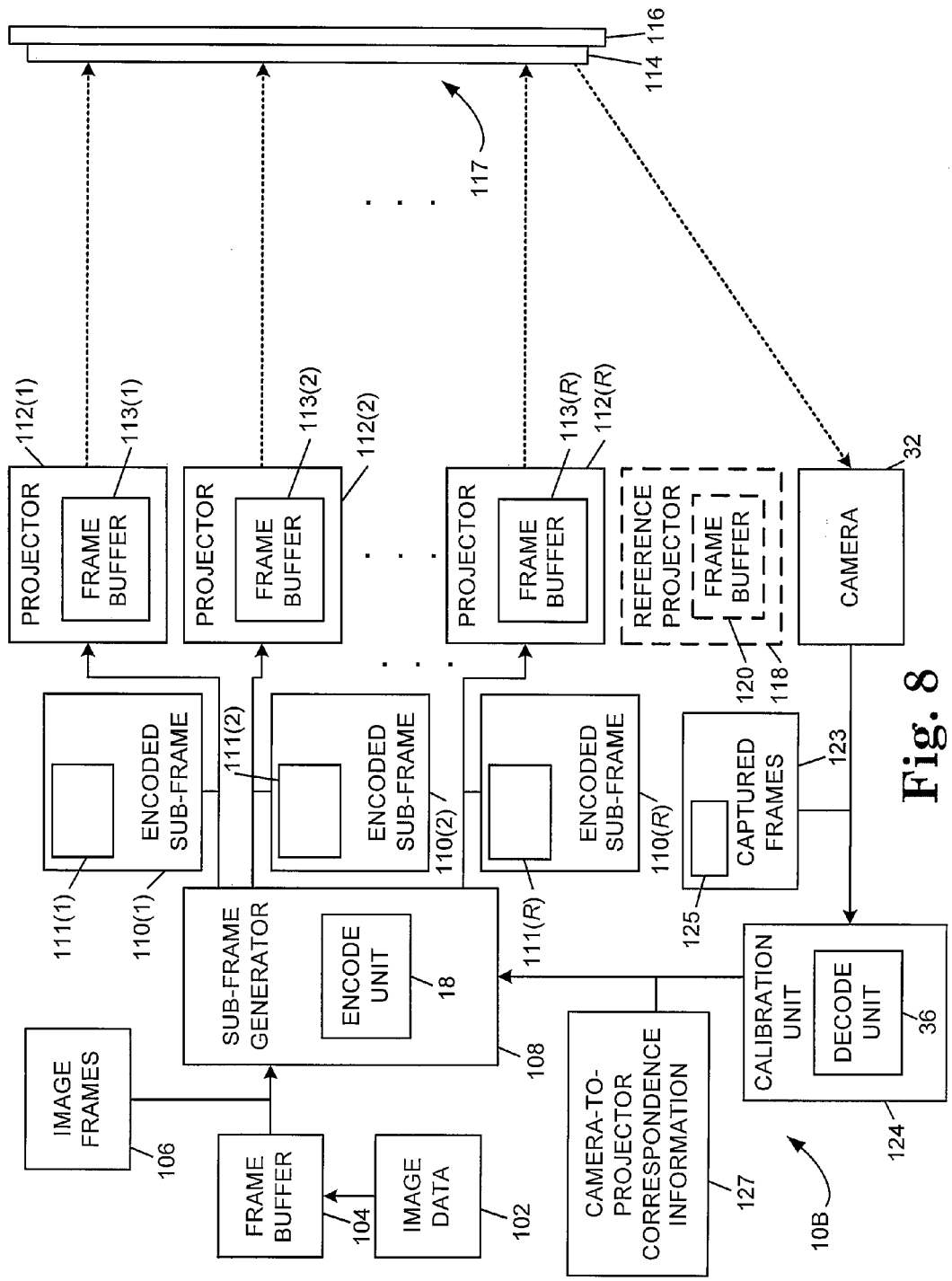
FIG. 8 is a block diagram illustrating one embodiment of an image display system.

FIG. 8 is a block diagram illustrating an image display system 10B according to one embodiment. Image display system 10B includes an image frame buffer 104, a sub-frame generator 108, projectors 112(1)-112(R) where R is an integer greater than or equal to two (collectively referred to as projectors 112), one or more cameras 32, and calibration unit 124.

Image display system 10B processes image data 102 and generates a corresponding displayed image 114 on a display surface 116. In the embodiment of FIG. 8, image display system 10B generates displayed image 114 on display surface 116 such that displayed image 114 is formed by overlapping or at least partially overlapping images on display surface 116. Displayed image 114 may also be adjacent to, tiled with, or partially overlapping with other images (not shown) on display surface 116. Displayed image 114 is defined to include any combination of pictorial, graphical, or textural characters, codes, illustrations, or other representations of information. Displayed image 114 may form a still image that is displayed on display surface 116 or may be one of a set of successive images in a video stream that is displayed on display surface 116.

Image frame buffer 104 receives and buffers image data 102 to create image frames 106. Sub-frame generator 108 processes image frames 106 to define corresponding encoded image sub-frames 110(1)-110(R) (collectively referred to as sub-frames 110) where R is an integer that is greater than or equal to two. For each image frame 106, sub-frame generator 108 generates one sub-frame 110 for each projector 112 in one embodiment. Sub-frames 110-110(R) are received by projectors 112-112(R), respectively, and stored in image frame buffers 113-113(R) (collectively referred to as image frame buffers 113), respectively. Projectors 112(1)-112(R) project the sub-frames 110(1)-110(RM), respectively, onto display surface 116 in at least partially overlapping and spatially offset positions to produce displayed image 114 for viewing by a user.

In one embodiment, image display system 10B attempts to determine appropriate values for the sub-frames 110 so that displayed image 114 produced by the projected sub-frames 110 is close in appearance to how a corresponding high-resolution image (e.g., a corresponding image frame 106) from which the sub-frame or sub-frames 110 were derived would appear if displayed directly.

Also shown in FIG. 8 is reference projector 118 with an image frame buffer 120. Reference projector 118 is shown with dashed lines in FIG. 8 because, in one embodiment, projector 118 is not an actual projector but rather a hypothetical high-resolution reference projector that is used in an image formation model for generating optimal sub-frames 110, as described in further detail below with reference to the embodiments of FIGS. 10 and 11. In one embodiment, the location of one of the actual projectors 112 is defined to be the location of the reference projector 118.

Display system 10B includes at least one camera 32 and calibration unit 124, which are used to automatically determine a geometric relationship between each projector 112 and the reference projector 118, as described in further detail below with reference to the embodiments of FIGS. 10 and 11. The geometric relationship is stored as camera-to-projector correspondence information 127.

Sub-frame generator 108 forms sub-frames 110 according to a geometric relationship between each of projectors 112 using camera-to-projector correspondence information 127 as described in additional detail below with reference to the embodiments of FIGS. 10 and 11.

In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

In one embodiment, display system 10B is configured to give the appearance to the human eye of high-resolution displayed images 114 by displaying overlapping and spatially shifted lower-resolution sub-frames 110. The projection of overlapping and spatially shifted sub-frames 110 may give the appearance of enhanced resolution (i.e., higher resolution than the sub-frames 110 themselves).

Sub-frames 110 projected onto display surface 116 may have perspective distortions, and the pixels may not appear as perfect squares with no variation in the offsets and overlaps from pixel to pixel, such as that shown in FIGS. 9A-9D. Rather, the pixels of sub-frames 110 may take the form of distorted quadrilaterals or some other shape, and the overlaps may vary as a function of position. Thus, terms such as "spatially shifted" and "spatially offset positions" as used herein are not limited to a particular pixel shape or fixed offsets and overlaps from pixel to pixel, but rather are intended to include any arbitrary pixel shape, and offsets and overlaps that may vary from pixel to pixel.

FIGS. 9A-9D are schematic diagrams illustrating the projection of four sub-frames 110(1), 110(2), 110(3), and 110(4). In this embodiment, projection system 10B includes four projectors 112, and sub-frame generator 108 generates a set of four sub-frames 110(1), 110(2), 110(3), and 110(4) for each image frame 106 for display by projectors 112. As such, sub-frames 110(1), 110(2), 110(3), and 110(4) each include a plurality of columns and a plurality of rows of individual pixels 202 of image data.

Figure 9A:
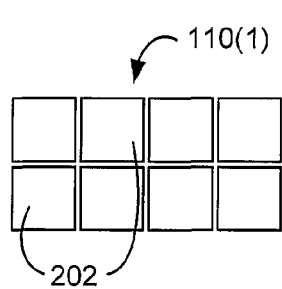
FIGS. 9A-9D are schematic diagrams illustrating one embodiment of the projection of four sub-frames.
Figure 9B:
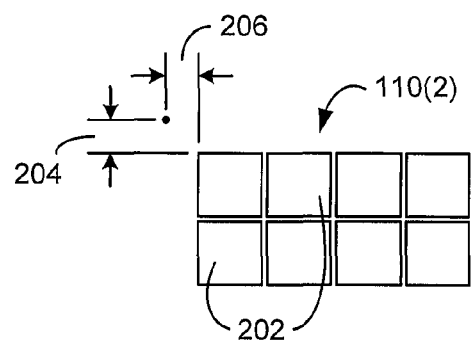
Figure 9C:
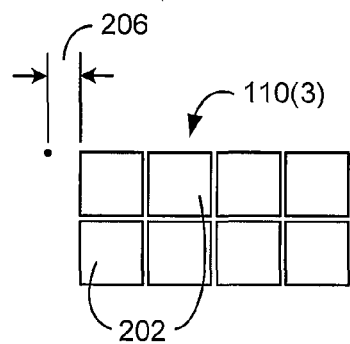
Figure 9D:
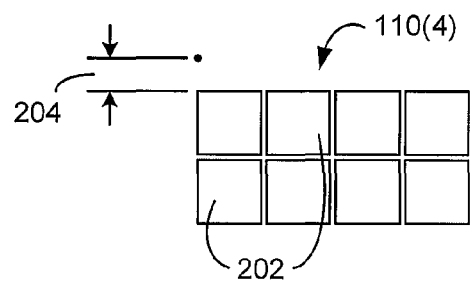

FIG. 9A illustrates the display of sub-frame 110(1) by a first projector 112(1). As illustrated in FIG. 9B, a second projector 112(2) displays sub-frame 110(2) offset from sub-frame 110(1) by a vertical distance 204 and a horizontal distance 206. As illustrated in FIG. 9C, a third projector 112(3) displays sub-frame 110(3) offset from sub-frame 110 (1) by horizontal distance 206. A fourth projector 112(4) displays sub-frame 110(4) offset from sub-frame 110(1) by vertical distance 204 as illustrated in FIG. 9D.

Sub-frame 110(1) is spatially offset from sub-frame 110(2) by a predetermined distance. Similarly, sub-frame 110(3) is spatially offset from sub-frame 110(4) by a predetermined distance. In one illustrative embodiment, vertical distance 204 and horizontal distance 206 are each approximately one-half of one pixel.

The display of sub-frames 110(2), 110(3), and 110(4) are spatially shifted relative to the display of sub-frame 110(1) by vertical distance 204, horizontal distance 206, or a combination of vertical distance 204 and horizontal distance 206. As such, pixels 202 of sub-frames 110(1), 110(2), 110(3), and 110(4) at least partially overlap thereby producing the appearance of higher resolution pixels. Sub-frames 110(1), 110(2), 110(3), and 110(4) may be superimposed on one another (i.e., fully or substantially fully overlap), may be tiled (i.e., partially overlap at or near the edges), or may be a combination of superimposed and tiled. The overlapped sub-frames 110 (1), 110(2), 110(3), and 110(4) also produce a brighter overall image than any of sub-frames 110(1), 110(2), 110(3), or 110(4) alone.

In the embodiment of FIG. 8, sub-frame generator 108 includes encode unit 18. Encode unit 18 operates in image display system 10B as described above with reference to image display system 10A (FIG. 1). In particular, encode unit 18 generates encoded image frames 20 (shown in FIG. 1, not shown in FIG. 8) from image frames 106 within sub-frame generator 108 to form color differencing codes in portions 21 (shown in FIG. 1, not shown in FIG. 8). Sub-frame generator 108 then generates encoded sub-frames 110 from these encoded image frames. Sub-frames 110(1)-(R), therefore, include encoded portions 111(1)-(R), respectively.

Projectors 112 display encoded sub-frames 110 so that displayed portions 117 that correspond to encoded portions 111 appear in displayed images 114. Camera 32 captures captured frames 123 from display surface 116 to include portions 125 that correspond to displayed portions 117. Calibration unit 124 includes decode unit 36. Decode unit 36 operates in image display system 10B as described above with reference to image display system 10A (FIG. 1). In particular, decode unit 36 identifies color differencing codes in portions 125 of captured frames 123.

Image display system 10B may use the color differencing codes for forensic marking, watermarking content, or performing other suitable functions. Image display system 10B may also use the color differencing codes for geometric calibration for each projector 112 using non-overlapping display areas of sub-frames 110. In other embodiments, image display system 10B may use, the color differencing codes for individual encoded subframes 110.

Image display system 10B includes hardware, software, firmware, or a combination of these. In one embodiment, one or more components of image display system 10B are included in a computer, computer server, or other microprocessor-based system capable of performing a sequence of logic operations. In addition, processing can be distributed throughout the system with individual portions being implemented in separate system components, such as in a networked or multiple computing unit environments.

Sub-frame generator 108 and calibration unit 124 may be implemented in hardware, software, firmware, or any combination thereof and may be combined into a unitary processing system. For example, sub-frame generator 108 and calibration unit 124 may include a microprocessor, programmable logic device, or state machine. Sub-frame generator 108 and calibration unit 124 may also include software stored on one or more computer-readable mediums and executable by a processing system (not shown). The term computer-readable medium as used herein is defined to include any kind of memory, volatile or non-volatile, such as floppy disks, hard disks, CD-ROMs, flash memory, read-only memory, and random access memory. Encode unit 18 and decode unit 36 may be independent from, rather than integrated with, sub-frame generator 108 and calibration unit 124, respectively, in other embodiments.

Image frame buffer 104 includes memory for storing image data 102 for image frames 106. Thus, image frame buffer 104 constitutes a database of image frames 106. Image frame buffers 113 also include memory for storing any number of sub-frames 110. Examples of image frame buffers 104 and 113 include non-volatile memory (e.g., a hard disk drive or other persistent storage device) and may include volatile memory (e.g., random access memory (RAM)).

Display surface 116 may be planar, non-planar, curved, or have any other suitable shape. In one embodiment, display surface 116 reflects the light projected by projectors 112 to form displayed image 114. In another embodiment, display surface 116 is translucent, and display system 10B is configured as a rear projection system.

In other embodiments, other numbers of projectors 112 are used in system 10B and other numbers of sub-frames 110 are generated for each image frame 106.

In other embodiments, sub-frames 110(1), 110(2), 110(3), and 110(4) may be displayed at other spatial offsets relative to one another and the spatial offsets may vary over time.

In one embodiment, sub-frames 110 have a lower resolution than image frames 106. Thus, sub-frames 110 are also referred to herein as low-resolution images or sub-frames 110, and image frames 106 are also referred to herein as high-resolution images or frames 106. The terms low resolution and high resolution are used herein in a comparative fashion, and are not limited to any particular minimum or maximum number of pixels.

In one embodiment, display system 10B produces at least a partially superimposed projected output that takes advantage of natural pixel misregistration to provide a displayed image with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected. In one embodiment described with reference to FIG. 11 below, the signal processing model is used to derive values for sub-frames 110 that minimize visual color artifacts that can occur due to offset projection of single-color sub-frames 110.

In one embodiment, sub-frame generator 108 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image. The generation of optimal sub-frames 110 based on a simulated high-resolution image and a desired high-resolution image is described in further detail below with reference to the embodiment of FIGS. 10 and 11.

Figure 11:
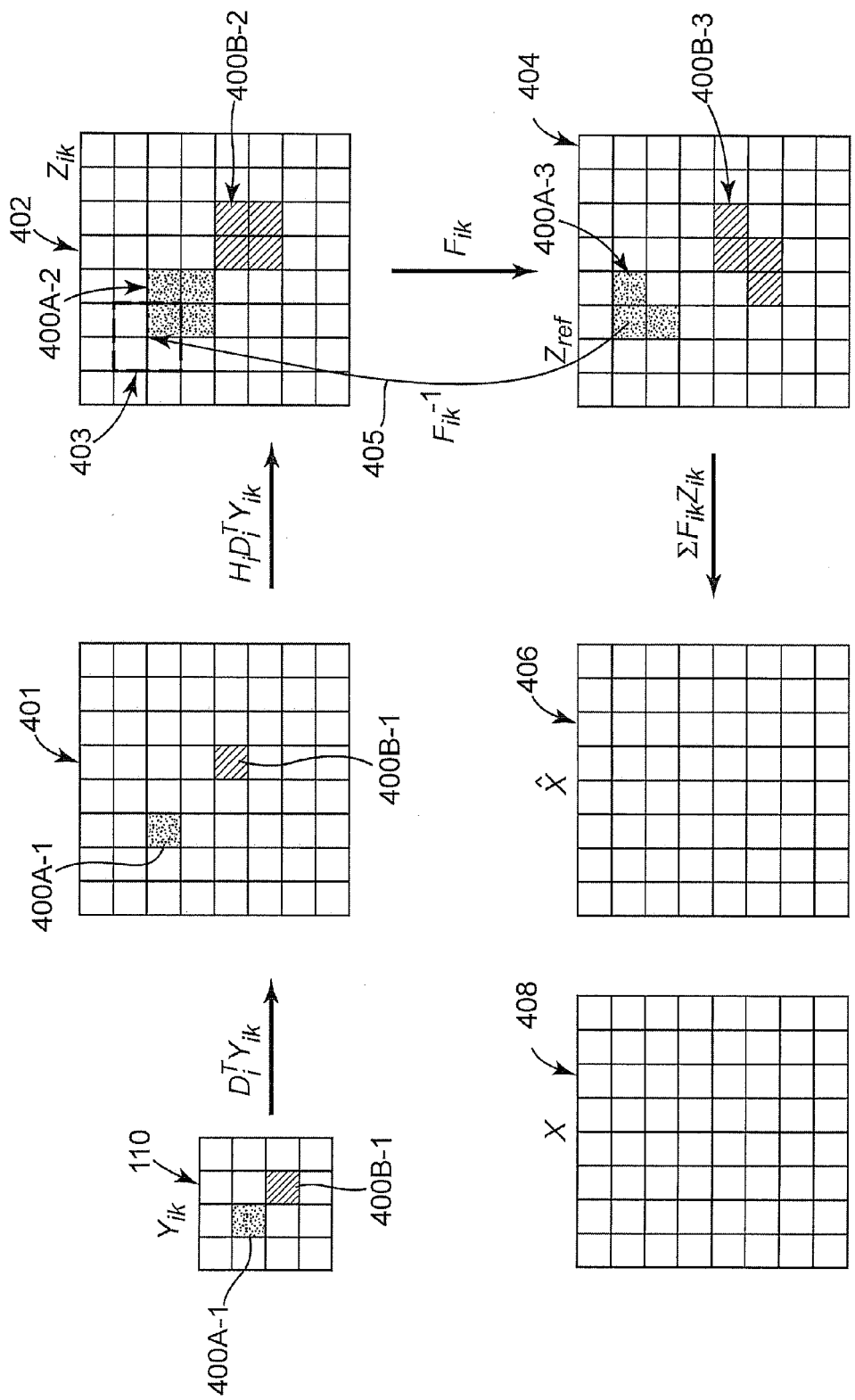
FIG. 11 is a diagram illustrating one embodiment of a model of an image formation process.

One form of the embodiment of FIG. 11 determines and generates single-color sub-frames 110 for each projector 112 that minimize color aliasing due to offset projection. This process may be thought of as inverse de-mosaicking. A de-mosaicking process seeks to synthesize a high-resolution, full color image free of color aliasing given color samples taken at relative offsets. One form of the embodiment of FIG. 11 essentially performs the inverse of this process and determines the colorant values to be projected at relative offsets, given a full color high-resolution image 106.

Figure 10:
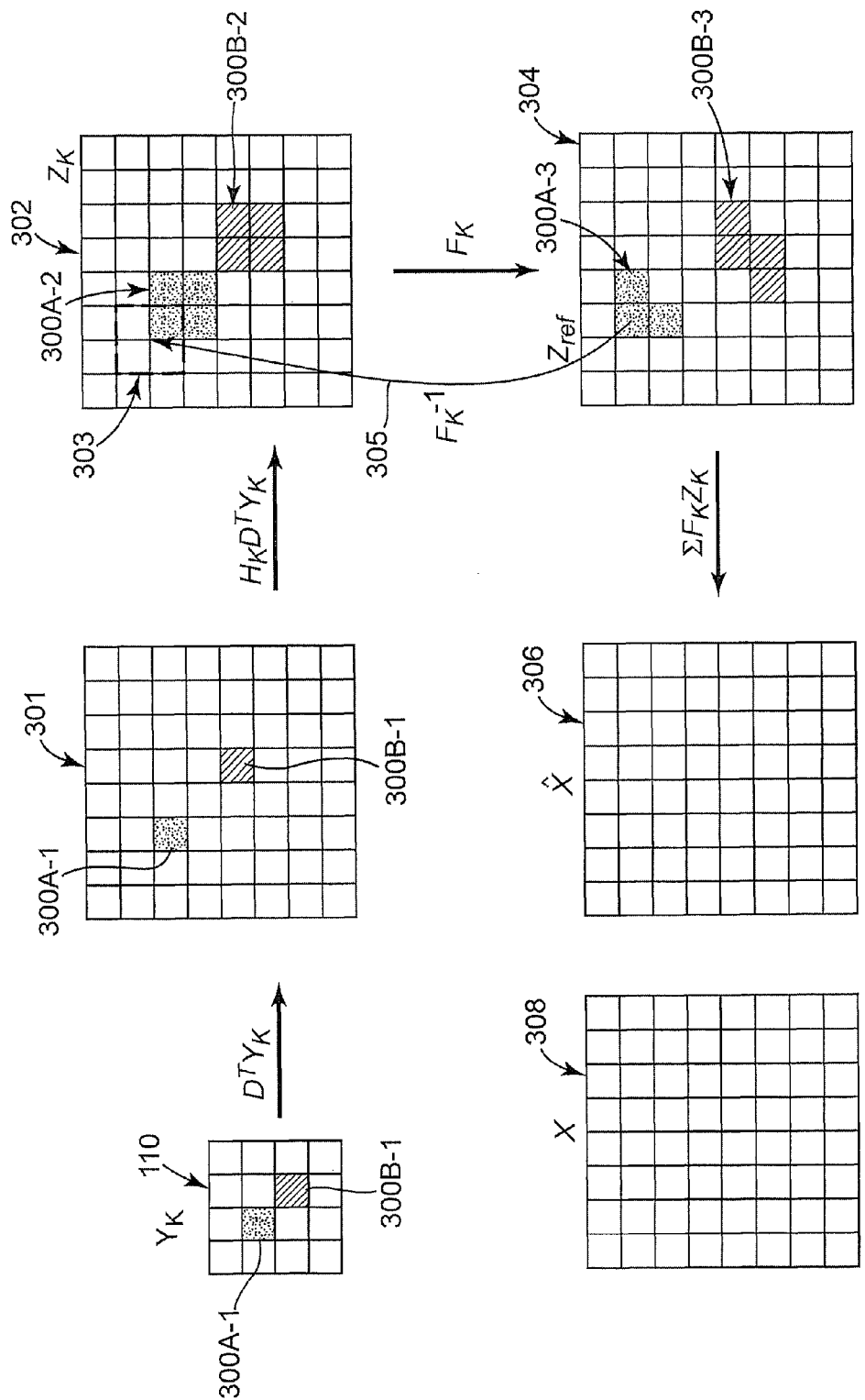
FIG. 10 is a diagram illustrating one embodiment of a model of an image formation process.

FIG. 10 is a diagram illustrating a model of an image formation process performed by sub-frame generator 108 for in image display system 10B. Sub-frames 110 are represented in the model by $Y_k$, where "k" is an index for identifying the individual projectors 112. Thus, $Y_1$, for example, corresponds to a sub-frame 110 for a first projector 112, $Y_2$ corresponds to a sub-frame 110 for a second projector 112, etc. Two of the sixteen pixels of the sub-frame 110 shown in FIG. 10 are highlighted, and identified by reference numbers 300A-1 and 300B-1. Sub-frames 110 ($Y_k$) are represented on a hypothetical high-resolution grid by up-sampling (represented by $D^T$) to create up-sampled image 301. The up-sampled image 301 is filtered with an interpolating filter (represented by $H_k$) to create a high-resolution image 302 ($Z_k$) with "chunky pixels". This relationship is expressed in the following Equation I:

$$Z_k = H_k D^T Y_k \qquad \text{Equation I}$$

where:
  k=index for identifying the projectors 112;
  $Z_k$=low-resolution sub-frame 110 of the kth projector 112 on a hypothetical high-resolution grid;
  $H_k$=Interpolating filter for low-resolution sub-frame 110 from kth projector 112;
  $D^T$=up-sampling matrix; and
  $Y_k$=low-resolution sub-frame 110 of the kth projector 112.

The low-resolution sub-frame pixel data ($Y_k$) is expanded with the up-sampling matrix ($D^T$) so that sub-frames 110 ($Y_k$) can be represented on a high-resolution grid. The interpolating filter ($H_k$) fills in the missing pixel data produced by up-sampling. In the embodiment shown in FIG. 10, pixel 300A-1 from the original sub-frame 110 ($Y_k$) corresponds to four pixels 300A-2 in the high-resolution image 302 ($Z_k$), and pixel 300B-1 from the original sub-frame 110 ($Y_k$) corresponds to four pixels 300B-2 in the high-resolution image 302 ($Z_k$). The resulting image 302 ($Z_k$) in Equation I models the output of the $k^{th}$ projector 112 if there was no relative distortion or noise in the projection process. Relative geometric distortion between the projected component sub-frames 110 results due to the different optical paths and locations of the component projectors 112. A geometric transformation is modeled with the operator, $F_k$, which maps coordinates in the frame buffer 113 of the $k^{th}$ projector 112 to frame buffer 120 of hypothetical reference projector 118 with sub-pixel accuracy, to generate a warped image 304 ($Z_{ref}$). In one embodiment, $F_k$ is linear with respect to pixel intensities, but is non-linear with respect to the coordinate transformations. As shown in FIG. 10, the four pixels 300A-2 in image 302 are mapped to the three pixels 300A-3 in image 304, and the four pixels 300B-2 in image 302 are mapped to the four pixels 300B-3 in image 304.

In one embodiment, the geometric mapping ($F_k$) is a floating-point mapping, but the destinations in the mapping are on an integer grid in image 304. Thus, it is possible for multiple pixels in image 302 to be mapped to the same pixel location in image 304, resulting in missing pixels in image 304. To avoid this situation, in one embodiment, during the forward mapping ($F_k$), the inverse mapping ($F_k^{-1}$) is also utilized as indicated at 305 in FIG. 10. Each destination pixel in image 304 is back projected (i.e., $F_k^{-1}$) to find the corresponding location in image 302. For the embodiment shown in FIG. 10, the location in image 302 corresponding to the upper-left pixel of the pixels 300A-3 in image 304 is the location at the upper-left corner of the group of pixels 300A-2. In one embodiment, the values for the pixels neighboring the identified location in image 302 are combined (e.g., averaged) to form the value for the corresponding pixel in image 304. Thus, for the example shown in FIG. 10, the value for the upper-left pixel in the group of pixels 300A-3 in image 304 is determined by averaging the values for the four pixels within the frame 303 in image 302.

In another embodiment, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 302 is mapped to a floating point location in image 304, some of the image data for the pixel is essentially scattered to multiple pixels neighboring the floating point location in image 304. Thus, each pixel in image 304 may receive contributions from multiple pixels in image 302, and each pixel in image 304 is normalized based on the number of contributions it receives.

A superposition/summation of such warped images 304 from all of the component projectors 112 forms a hypothetical or simulated high-resolution image 306 ($\hat{X}$, also referred to as X-hat herein) in reference projector frame buffer 120, as represented in the following Equation II:

$$\hat{X} = \sum_k F_k Z_k \qquad \text{Equation II}$$

where:
  k=index for identifying the projectors 112;
  X-hat=hypothetical or simulated high-resolution image 306 in the reference projector frame buffer 120;
  $F_k$=operator that maps a low-resolution sub-frame 110 of the kth projector 112 on a hypothetical high-resolution grid to the reference projector frame buffer 120; and
  $Z_k$=low-resolution sub-frame 110 of kth projector 112 on a hypothetical high-resolution grid, as defined in Equation I.

If the simulated high-resolution image 306 (X-hat) in reference projector frame buffer 120 is identical to a given (desired) high-resolution image 308 (X), the system of component low-resolution projectors 112 would be equivalent to a hypothetical high-resolution projector placed at the same location as hypothetical reference projector 118 and sharing its optical path. In one embodiment, the desired high-resolution images 308 are the high-resolution image frames 106 received by sub-frame generator 108.

In one embodiment, the deviation of the simulated high-resolution image 306 (X-hat) from the desired high-resolution image 308 (X) is modeled as shown in the following Equation III:

$$X = \hat{X} = \eta \qquad \text{Equation III}$$

where:
  X=desired high-resolution frame 308;
  X-hat=hypothetical or simulated high-resolution frame 306 in reference projector frame buffer 120; and
  $\eta$=error or noise term.

As shown in Equation III, the desired high-resolution image 308 (X) is defined as the simulated high-resolution image 306 (X-hat) plus $\eta$, which in one embodiment represents zero mean white Gaussian noise.

The solution for the optimal sub-frame data ($Y_k^*$) for sub-frames 110 is formulated as the optimization given in the following Equation IV:

$$Y_k^* = \underset{Y_k}{\operatorname{argmax}} P(\hat{X}|X) \qquad \text{Equation IV}$$

where:
  k=index for identifying the projectors 112;
  $Y_k^*$=optimum low-resolution sub-frame 110 of the kth projector 112;
  $Y_k$=low-resolution sub-frame 110 of the kth projector 112;
  X-hat=hypothetical or simulated high-resolution frame 306 in reference projector frame buffer 120, as defined in Equation II;
  X=desired high-resolution frame 308; and
  P(X-hat|X)=probability of X-hat given X Thus, as indicated by Equation IV, the goal of the optimization is to determine the sub-frame values ($Y_k$) that maximize the probability of X-hat given X. Given a desired high-resolution image 308 (X) to be projected, sub-frame generator 108 determines the component sub-frames 110 that maximize the probability that the simulated high-resolution image 306 (X-hat) is the same as or matches the "true" high-resolution image 308 (X).

Using Bayes rule, the probability P(X-hat|X) in Equation IV can be written as shown in the following Equation V:

$$P(\hat{X}|X) = P(X|\hat{X})P(\hat{X})/P(X) \qquad \text{Equation V}$$

where:
  X-hat=hypothetical or simulated high-resolution frame 306 in reference projector frame buffer 120, as defined in Equation II;
  X=desired high-resolution frame 308;
  P(X-hat|X)=probability of X-hat given X;
  P(X|X-hat)=probability of X given X-hat;
  P(X-hat)=prior probability of X-hat; and
  P(X)=prior probability of X.

The term P(X) in Equation V is a known constant. If X-hat is given, then, referring to Equation III, X depends only on the noise term, η, which is Gaussian. Thus, the term P(X|X-hat) in Equation V will have a Gaussian form as shown in the following Equation VI:

$$P(X|\hat{X}) = \frac{1}{C} e^{-\frac{\|X-\hat{X}\|^2}{2\sigma^2}} \qquad \text{Equation VI}$$

where:
- X-hat=hypothetical or simulated high-resolution frame 306 in reference projector frame buffer 120, as defined in Equation II;
- X=desired high-resolution frame 308;
- P(X|X-hat)=probability of X given X-hat;
- C=normalization constant; and
- σ=variance of the noise term, η.

To provide a solution that is robust to minor calibration errors and noise, a "smoothness" requirement is imposed on X-hat. In other words, it is assumed that good simulated images 306 have certain properties. The smoothness requirement according to one embodiment is expressed in terms of a desired Gaussian prior probability distribution for X-hat given by the following Equation VII:

$$P(\hat{X}) = \frac{1}{Z(\beta)} e^{-\{\beta^2(\|\nabla \hat{X}\|^2)\}} \qquad \text{Equation VII}$$

where:
- P(X-hat)=prior probability of X-hat;
- β=smoothing constant;
- Z(β)=normalization function;
- ∇=gradient operator; and
- X-hat=hypothetical or simulated high-resolution frame 306 in reference projector frame buffer 120, as defined in Equation II.

In another embodiment, the smoothness requirement is based on a prior Laplacian model, and is expressed in terms of a probability distribution for X-hat given by the following Equation VIII:

$$P(\hat{X}) = \frac{1}{Z(\beta)} e^{-\{\beta(\|\nabla \hat{X}\|)\}} \qquad \text{Equation VIII}$$

where:
- P(X-hat)=prior probability of X-hat;
- β=smoothing constant;
- Z(β)=normalization function;
- ∇=gradient operator; and
- X-hat=hypothetical or simulated high-resolution frame 306 in reference projector frame buffer 120, as defined in Equation II.

The following discussion assumes that the probability distribution given in Equation VII, rather than Equation VIII, is being used. As will be understood by persons of ordinary skill in the art, a similar procedure would be followed if Equation VIII were used. Inserting the probability distributions from Equations VI and VII into Equation V, and inserting the result into Equation IV, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation IV is transformed into a function minimization problem, as shown in the following Equation IX:

$$Y_k^* = \underset{Y_k}{\operatorname{argmin}} \|X - \hat{X}\|^2 + \beta^2 \|\nabla \hat{X}\|^2 \qquad \text{Equation IX}$$

where:
- k=index for identifying the projectors 112;
- $Y_k^*$=optimum low-resolution sub-frame 110 of the kth projector 112;
- $Y_k$=low-resolution sub-frame 110 of the kth projector 112;
- X-hat=hypothetical or simulated high-resolution frame 306 in reference projector frame buffer 120, as defined in Equation II;
- X=desired high-resolution frame 308;
- β=smoothing constant; and
- ∇=gradient operator.

The function minimization problem given in Equation IX is solved by substituting the definition of X-hat from Equation II into Equation IX and taking the derivative with respect to $Y_k$, which results in an iterative algorithm given by the following Equation X:

$$Y_k^{(n+1)} = Y_k^{(n)} - \Theta\{DH_k^T F_k^T[(\hat{X}^{(n)} - X) + \beta^2 \nabla^2 \hat{X}^{(n)}]\} \qquad \text{Equation X}$$

where:
- k=index for identifying the projectors 112;
- n=index for identifying iterations;
- $Y_k^{(n+1)}$=low-resolution sub-frame 110 for the kth projector 112 for iteration number n+1;
- $Y_k^{(n)}$=low-resolution sub-frame 110 for the kth projector 112 for iteration number n;
- Θ=momentum parameter indicating the fraction of error to be incorporated at each iteration;
- D=down-sampling matrix;
- $H_k^T$=Transpose of interpolating filter, $H_k$, from Equation I (in the image domain, $H_k^T$ is a flipped version of $H_k$);
- $F_k^T$=Transpose of operator, $F_k$, from Equation II (in the image domain, $F_k^T$ is the inverse of the warp denoted by $F_k$);
- X-hat$^{(n)}$=hypothetical or simulated high-resolution frame 306 in the reference projector frame buffer, as defined in Equation II, for iteration number n;
- X=desired high-resolution frame 308;
- β=smoothing constant; and
- $\nabla^2$=Laplacian operator.

Equation X may be intuitively understood as an iterative process of computing an error in the hypothetical reference projector coordinate system and projecting it back onto the sub-frame data. In one embodiment, sub-frame generator 108 is configured to generate sub-frames 110 in real-time using Equation X. The generated sub-frames 110 are optimal in one embodiment because they maximize the probability that the simulated high-resolution image 306 (X-hat) is the same as the desired high-resolution image 308 (A), and they minimize the error between the simulated high-resolution image 306 and the desired high-resolution image 308. Equation X can be implemented very efficiently with conventional image processing operations (e.g., transformations, down-sampling, and filtering). The iterative algorithm given by Equation X converges rapidly in a few iterations and is very efficient in terms of memory and computation (e.g., a single iteration uses two rows in memory; and multiple iterations may also be rolled into a single step). The iterative algorithm given by Equation X is suitable for real-time implementation, and may be used to generate optimal sub-frames 110 at video rates, for example.

To begin the iterative algorithm defined in Equation X, an initial guess, $Y_k^{(O)}$, for sub-frames 110 is determined. In one embodiment, the initial guess for sub-frames 110 is determined by texture mapping the desired high-resolution frame 308 onto sub-frames 110. In one embodiment, the initial guess is determined from the following Equation XI:

$$Y_k^{(O)} = DB_k F_k^T X \quad \text{Equation XI}$$

where:
- k=index for identifying the projectors 112;
- $Y_k^{(O)}$=initial guess at the sub-frame data for the sub-frame 110 for the kth projector 112;
- D=down-sampling matrix;
- $B_k$=interpolation filter;
- $F_k^T$=Transpose of operator, $F_k$, from Equation II (in the image domain, $F_k^T$ is the inverse of the warp denoted by $F_k$); and
- X=desired high-resolution frame 308.

Thus, as indicated by Equation XI, the initial guess ($Y_k^{(O)}$) is determined by performing a geometric transformation ($F_k^T$) on the desired high-resolution frame 308 (X), and filtering ($B_k$) and down-sampling (D) the result. The particular combination of neighboring pixels from the desired high-resolution frame 308 that are used in generating the initial guess ($Y_k^{(O)}$) will depend on the selected filter kernel for the interpolation filter ($B_k$).

In another embodiment, the initial guess, $Y_k^{(O)}$, for sub-frames 110 is determined from the following Equation XII $$Y_k^{(O)} = DF_k^T X \quad \text{Equation XII}$$

where:
- k=index for identifying the projectors 112;
- $Y_k^{(O)}$=initial guess at the sub-frame data for the sub-frame 110 for the kth projector 112;
- D=down-sampling matrix;
- $F_k^T$=Transpose of operator, $F_k$, from Equation II (in the image domain, $F_k^T$ is the inverse of the warp denoted by $F_k$); and
- X=desired high-resolution frame 308.

Equation XII is the same as Equation XI, except that the interpolation filter ($B_k$) is not used.

Several techniques are available to determine the geometric mapping ($F_k$) between each projector 112 and hypothetical reference projector 118, including manually establishing the mappings, using structured light coding, or using camera 32 and calibration unit 124 to automatically determine the mappings. In one embodiment, if camera 32 and calibration unit 124 are used, the geometric mappings between each projector 112 and camera 32 are determined by calibration unit 124. These projector-to-camera mappings may be denoted by $T_k$, where k is an index for identifying projectors 112. Based on the projector-to-camera mappings ($T_k$), the geometric mappings ($F_k$) between each projector 112 and hypothetical reference projector 118 are determined by calibration unit 124, and provided to sub-frame generator 108. For example, in a display system 10B with two projectors 112(1) and 112(2), assuming the first projector 112(1) is hypothetical reference projector 118, the geometric mapping of the second projector 112(2) to the first (reference) projector 112(1) can be determined as shown in the following Equation XIII:

$$F_2 = T_2 T_1^{-1} \quad \text{Equation XIII}$$

where:
- $F_2$=operator that maps a low-resolution sub-frame 110 of the second projector 112(2) to the first (reference) projector 112(1);
- $T_1$=geometric mapping between the first projector 112(1) and camera 32; and
- $T_2$=geometric mapping between the second projector 112(2) and camera 32.

Calibration unit 124 continually or periodically determines (e.g., once per frame 106) the geometric mappings ($F_k$), stores the geometric mappings ($F_k$) as camera-to-projector correspondence information 127, and provides updated values for the mappings to sub-frame generator 108.

One embodiment provides an image display system 10B with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images at high lumen levels, but at lower cost than existing high-resolution projection systems, such as a single, high-resolution, high-output projector. One embodiment provides a scalable image display system 10B that can provide virtually any desired resolution, brightness, and color, by adding any desired number of component projectors 112 to the system 10B.

In some existing display systems, multiple low-resolution images are displayed with temporal and sub-pixel spatial offsets to enhance resolution. There are some important differences between these existing systems and embodiments described herein. For example, in one embodiment, there is no need for circuitry to offset the projected sub-frames 110 temporally. In one embodiment, sub-frames 110 from the component projectors 112 are projected "in-sync". As another example, unlike some existing systems where all of the sub-frames go through the same optics and the shifts between sub-frames are all simple translational shifts, in one embodiment, sub-frames 110 are projected through the different optics of the multiple individual projectors 112. In one embodiment, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods may assume simple shift offsets between projectors, use frequency domain analyses, and rely on heuristic methods to compute component sub-frames. In contrast, one form of the embodiments described herein utilize an optimal real-time sub-frame generation algorithm that explicitly accounts for arbitrary relative geometric distortion (not limited to homographies) between the component projectors 112, including distortions that occur due to a display surface that is non-planar or has surface non-uniformities. One embodiment generates sub-frames 110 based on a geometric relationship between a hypothetical high-resolution hypothetical reference projector at any arbitrary location and each of the actual low-resolution projectors 112, which may also be positioned at any arbitrary location.

In one embodiment, image display system 10B is configured to project images that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 10B may be combined or used with other display systems or display techniques, such as tiled displays.

Naïve overlapped projection of different colored sub-frames 110 by different projectors 112 can lead to significant color artifacts at the edges due to misregistration among the colors. In the embodiments of FIG. 11, sub-frame generator 108 determines the single-color sub-frames 110 to be projected by each projector 112 so that the visibility of color artifacts is minimized.

FIG. 11 is a diagram illustrating a model of an image formation process according to one embodiment. The sub-frames 110 are represented in the model by $Y_{ik}$, where "k" is an index for identifying individual sub-frames 110, and "i" is an index for identifying color planes. Two of the sixteen pixels of the sub-frame 110 shown in FIG. 11 are highlighted, and identified by reference numbers 400A-1 and 400B-1. The sub-frames 110 ($Y_{ik}$) are represented on a hypothetical high-resolution grid by up-sampling (represented by $D_i^T$) to create up-sampled image 401. The up-sampled image 401 is filtered with an interpolating filter (represented by $H_i$) to create a high-resolution image 402 ($Z_{ik}$) with "chunky pixels". This relationship is expressed in the following Equation XIV:

$$Z_{ik} = H_i D_i^T Y_{ik} \qquad \text{Equation XIV}$$

where:
k=index for identifying individual sub-frames 110;
i=index for identifying color planes;
$Z_{ik}$=kth low-resolution sub-frame 110 in the ith color plane on a hypothetical high-resolution grid;
$H_i$=Interpolating filter for low-resolution sub-frames 110 in the ith color plane;
$D_i^T$=up-sampling matrix for sub-frames 110 in the ith color plane; and
$Y_{ik}$=kth low-resolution sub-frame 110 in the ith color plane.

The low-resolution sub-frame pixel data ($Y_{ik}$) is expanded with the up-sampling matrix ($D_i^T$) so that the sub-frames 110 ($Y_{ik}$) can be represented on a high-resolution grid. The interpolating filter ($H_i$) fills in the missing pixel data produced by up-sampling. In the embodiment shown in FIG. 11, pixel 400A-1 from the original sub-frame 110 ($Y_{ik}$) corresponds to four pixels 400A-2 in the high-resolution image 402 ($Z_{ik}$), and pixel 400B-1 from the original sub-frame 110 ($Y_{ik}$) corresponds to four pixels 400B-2 in the high-resolution image 402 ($Z_{ik}$). The resulting image 402 ($Z_{ik}$) in Equation XIV models the output of the projectors 112 if there was no relative distortion or noise in the projection process. Relative geometric distortion between the projected component sub-frames 110 results due to the different optical paths and locations of the component projectors 112. A geometric transformation is modeled with the operator, $F_{ik}$, which maps coordinates in the frame buffer 113 of a projector 112 to the frame buffer 120 of the reference projector 118 (FIG. 8) with sub-pixel accuracy, to generate a warped image 404 ($Z_{ref}$). In one embodiment, $F_{ik}$ is linear with respect to pixel intensities, but is non-linear with respect to the coordinate transformations. As shown in FIG. 11, the four pixels 400A-2 in image 402 are mapped to the three pixels 400A-3 in image 404, and the four pixels 400B-2 in image 402 are mapped to the four pixels 400B-3 in image 404.

In one embodiment, the geometric mapping ($F_{ik}$) is a floating-point mapping, but the destinations in the mapping are on an integer grid in image 404. Thus, it is possible for multiple pixels in image 402 to be mapped to the same pixel location in image 404, resulting in missing pixels in image 404. To avoid this situation, in one embodiment, during the forward mapping ($F_{ik}$), the inverse mapping ($F_{ik}^{-1}$) is also utilized as indicated at 405 in FIG. 11. Each destination pixel in image 404 is back projected (i.e., $F_{ik}^{-1}$) to find the corresponding location in image 402. For the embodiment shown in FIG. 11, the location in image 402 corresponding to the upper-left pixel of the pixels 400A-3 in image 404 is the location at the upper-left corner of the group of pixels 400A-2. In one embodiment, the values for the pixels neighboring the identified location in image 402 are combined (e.g., averaged) to form the value for the corresponding pixel in image 404. Thus, for the example shown in FIG. 11, the value for the upper-left pixel in the group of pixels 400A-3 in image 404 is determined by averaging the values for the four pixels within the frame 403 in image 402.

In another embodiment, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 402 is mapped to a floating point location in image 404, some of the image data for the pixel is essentially scattered to multiple pixels neighboring the floating point location in image 404. Thus, each pixel in image 404 may receive contributions from multiple pixels in image 402, and each pixel in image 404 is normalized based on the number of contributions it receives.

A superposition/summation of such warped images 404 from all of the component projectors 112 in a given color plane forms a hypothetical or simulated high-resolution image (X-hat$_i$) for that color plane in the reference projector frame buffer 120, as represented in the following Equation XV:

$$\hat{X}_i = \sum_k F_{ik} Z_{ik} \qquad \text{Equation XV}$$

where:
k=index for identifying individual sub-frames 110;
i=index for identifying color planes;
X-hat$_i$=hypothetical or simulated high-resolution image for the ith color plane in the reference projector frame buffer 120;
$F_{ik}$=operator that maps the kth low-resolution sub-frame 110 in the ith color plane on a hypothetical high-resolution grid to the reference projector frame buffer 120; and
$Z_{ik}$=kth low-resolution sub-frame 110 in the ith color plane on a hypothetical high-resolution grid, as defined in Equation XIV.

A hypothetical or simulated image 406 (X-hat) is represented by the following Equation XVI:

$$\hat{X} = [\hat{X}_1 \hat{X}_2 \ldots \hat{X}_N]^T \qquad \text{Equation XVI}$$

where:
X-hat=hypothetical or simulated high-resolution image in the reference projector frame buffer 120;

X-hat$_1$=hypothetical or simulated high-resolution image for the first color plane in the reference projector frame buffer 120, as defined in Equation XV;

X-hat$_2$=hypothetical or simulated high-resolution image for the second color plane in the reference projector frame buffer 120, as defined in Equation XV;

X-hat$_N$=hypothetical or simulated high-resolution image for the Nth color plane in the reference projector frame buffer 120, as defined in Equation XV; and N=number of color planes.

If the simulated high-resolution image 406 (X-hat) in the reference projector frame buffer 120 is identical to a given (desired) high-resolution image 408 (X), the system of component low-resolution projectors 112 would be equivalent to a hypothetical high-resolution projector placed at the same location as the reference projector 118 and sharing its optical path. In one embodiment, the desired high-resolution images 408 are the high-resolution image frames 106 (FIG. 8) received by sub-frame generator 108.

In one embodiment, the deviation of the simulated high-resolution image 406 (X-hat) from the desired high-resolution image 408 (Y) is modeled as shown in the following Equation XVII:

$$X = \hat{X} + \eta \qquad \text{Equation XVII}$$

where:
X=desired high-resolution frame 408;
X-hat=hypothetical or simulated high-resolution frame 406 in the reference projector frame buffer 120; and
η=error or noise term.

As shown in Equation XVII, the desired high-resolution image 408 (X) is defined as the simulated high-resolution image 406 (X-hat) plus η, which in one embodiment represents zero mean white Gaussian noise.

The solution for the optimal sub-frame data (Y$_{ik}$*) for the sub-frames 110 is formulated as the optimization given in the following Equation XVIII:

$$Y_{ik}^* = \underset{Y_{ik}}{\operatorname{argmax}} P(\hat{X}|X) \qquad \text{Equation XVIII}$$

where:
k=index for identifying individual sub-frames 110;
i=index for identifying color planes;
Y$_{ik}$*=optimum low-resolution sub-frame data for the kth sub-frame 110 in the ith color plane;
Y$_{ik}$=kth low-resolution sub-frame 110 in the ith color plane;
X-hat=hypothetical or simulated high-resolution frame 406 in the reference projector frame buffer 120, as defined in Equation XVI;
X=desired high-resolution frame 408; and
P(X-hat|X)=probability of X-hat given X.

Thus, as indicated by Equation XVIII, the goal of the optimization is to determine the sub-frame values (Y$_{ik}$) that maximize the probability of X-hat given X. Given a desired high-resolution image 408 (X) to be projected, sub-frame generator 108 (FIG. 8) determines the component sub-frames 110 that maximize the probability that the simulated high-resolution image 406 (X-hat) is the same as or matches the "true" high-resolution image 408 (X).

Using Bayes rule, the probability P(X-hat|X) in Equation XVIII can be written as shown in the following Equation XIX:

$$P(\hat{X}|X) = \frac{P(X|\hat{X})P(\hat{X})}{P(X)} \qquad \text{Equation XIX}$$

where:
X-hat=hypothetical or simulated high-resolution frame 406 in the reference projector frame buffer 120, as defined in Equation XVI;
X=desired high-resolution frame 408;
P(X-hat|X)=probability of X-hat given X;
P(X|X-hat)=probability of X given X-hat;
P(X-hat)=prior probability of X-hat; and
P(X)=prior probability of X.

The term P(X) in Equation XIX is a known constant. If X-hat is given, then, referring to Equation XVII, X depends only on the noise term, η, which is Gaussian. Thus, the term P(X|X-hat) in Equation XIX will have a Gaussian form as shown in the following Equation XX:

$$P(X|\hat{X}) = \frac{1}{C} e^{-\sum_i \frac{\left(\|X_i - \hat{X}_i\|^2\right)}{2\sigma_i^2}} \qquad \text{Equation XX}$$

where:
X-hat=hypothetical or simulated high-resolution frame 406 in the reference projector frame buffer 120, as defined in Equation XVI;
X=desired high-resolution frame 408;
P(X|X-hat)=probability of X given X-hat;
C=normalization constant;
i=index for identifying color planes;
X$_i$=ith color plane of the desired high-resolution frame 408;
X-hat$_i$=hypothetical or simulated high-resolution image for the ith color plane in the reference projector frame buffer 120, as defined in Equation II; and
σ$_i$=variance of the noise term, η, for the ith color plane.

To provide a solution that is robust to minor calibration errors and noise, a "smoothness" requirement is imposed on X-hat. In other words, it is assumed that good simulated images 406 have certain properties. For example, for most good color images, the luminance and chrominance derivatives are related by a certain value. In one embodiment, a smoothness requirement is imposed on the luminance and chrominance of the X-hat image based on a "Hel-Or" color prior model, which is a conventional color model known to those of ordinary skill in the art. The smoothness requirement according to one embodiment is expressed in terms of a desired probability distribution for X-hat given by the following Equation XXI:

$$P(\hat{X}) = \frac{1}{Z(\alpha, \beta)} e^{-\left\{\alpha^2 \left(\|\nabla \hat{C}_1\|^2 + \|\nabla \hat{C}_2\|^2\right) + \beta^2 \left(\|\nabla \hat{L}\|^2\right)\right\}} \qquad \text{Equation XXI}$$

where:
P(X-hat)=prior probability of X-hat;
α and β=smoothing constants;
Z(α,β)=normalization function;
∇=gradient operator;
C-hat$_1$=first chrominance channel of X-hat;
C-hat$_2$=second chrominance channel of X-hat; and
L-hat=luminance of X-hat.

In another embodiment, the smoothness requirement is based on a prior Laplacian model, and is expressed in terms of a probability distribution for X-hat given by the following Equation XXII:

$$P(\hat{X}) = \frac{1}{Z(\alpha, \beta)} e^{-\{\alpha(|\nabla \hat{C}_1| + |\nabla \hat{C}_2|) + \beta(|\nabla \hat{L}|)\}} \quad \text{Equation XXII}$$

where:
P(X-hat)=prior probability of X-hat;
$\alpha$ and $\beta$=smoothing constants;
Z($\alpha,\beta$)=normalization function;
$\nabla$=gradient operator; and
C-hat$_1$=first chrominance channel of X-hat;
C-hat$_2$=second chrominance channel of X-hat; and
L-hat=luminance of X-hat.

The following discussion assumes that the probability distribution given in Equation XXI, rather than Equation XXII, is being used. As will be understood by persons of ordinary skill in the art, a similar procedure would be followed if Equation XXII were used. Inserting the probability distributions from Equations VII and VIII into Equation XIX, and inserting the result into Equation XVIII, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation XVIII is transformed into a function minimization problem, as shown in the following Equation XXIII:

$$Y_{ik}^* = \underset{Y_{ik}}{\operatorname{argmin}} \sum_{i=1}^{N} \|X_i - \hat{X}_i\|^2 + \quad \text{Equation XXIII}$$

$$\alpha^2 \left\{ \left\| \nabla \left( \sum_{i=1}^{N} T_{C_1 i} \hat{X}_i \right) \right\|^2 + \left\| \nabla \left( \sum_{i=1}^{N} T_{C_2 i} \hat{X}_i \right) \right\|^2 \right\} +$$

$$\beta^2 \left\| \nabla \left( \sum_{i=1}^{N} T_{Li} \hat{X}_i \right) \right\|^2$$

where:
k=index for identifying individual sub-frames 110;
i=index for identifying color planes;
$Y_{ik}$=optimum low-resolution sub-frame data for the kth sub-frame 110 in the ith color plane;
$Y_{ik}$=kth low-resolution sub-frame 110 in the ith color plane;
N=number of color planes;
$X_i$=ith color plane of the desired high-resolution frame 408;
X-hat$_i$=hypothetical or simulated high-resolution image for the ith color plane in the reference projector frame buffer 120, as defined in Equation XV;
$\alpha$ and $\beta$=smoothing constants;
$\nabla$=gradient operator;
$T_{C1i}$=ith element in the second row in a color transformation matrix, T, for transforming the first chrominance channel of X-hat;
$T_{C2i}$=ith element in the third row in a color transformation matrix, T, for transforming the second chrominance channel of X-hat; and $T_{Li}$=ith element in the first row in a color transformation matrix, T, for transforming the luminance of X-hat.

The function minimization problem given in Equation XXIII is solved by substituting the definition of X-hat$_i$ from Equation XV into Equation XXIII and taking the derivative with respect to $Y_{ik}$, which results in an iterative algorithm given by the following Equation XXIV:

$$Y_{ik}^{(n+1)} = Y_{ik}^{(n)} - \Theta \left\{ D_i F_{ik}^T H_i^T \left[ \left( \hat{X}_i^{(n)} - X_i \right) + \right. \right. \quad \text{Equation XXIV}$$

$$\alpha^2 \nabla^2 \left( T_{C_1 i} \sum_{j=1}^{N} T_{C_1 j} \hat{X}_j^{(n)} + T_{C_2 i} \sum_{j=1}^{N} T_{C_2 j} \hat{X}_j^{(n)} \right)$$

$$\left. \left. \ldots + \beta^2 \nabla^2 T_{Li} \sum_{j=1}^{N} T_{Lj} \hat{X}_j^{(n)} \right] \right\}$$

where:
k=index for identifying individual sub-frames 110;
i and j=indices for identifying color planes;
n=index for identifying iterations;
$Y_{ik}^{(n+1)}$=kth low-resolution sub-frame 110 in the ith color plane for iteration number n+1;
$Y_{ik}^{(n)}$=kth low-resolution sub-frame 110 in the ith color plane for iteration number n;
$\Theta$=momentum parameter indicating the fraction of error to be incorporated at each iteration;
$D_i$=down-sampling matrix for the ith color plane;
$H_i^T$=Transpose of interpolating filter, $H_i$, from Equation XIV (in the image domain, $H_i^T$ is a flipped version of $H_i$);
$F_{ik}^T$=Transpose of operator, $F_{ik}$, from Equation XV (in the image domain, $F_{ik}^T$ is the inverse of the warp denoted by $F_{ik}$);
X-hat$_i^{(n)}$=hypothetical or simulated high-resolution image for the ith color plane in the reference projector frame buffer 120, as defined in Equation XV, for iteration number n;
$X_i$=ith color plane of the desired high-resolution frame 408;
$\alpha$ and $\beta$=smoothing constants;
$\nabla_2$=Laplacian operator;
$T_{C1i}$=ith element in the second row in a color transformation matrix, T, for transforming the first chrominance channel of X-hat;
$T_{C2i}$=ith element in the third row in a color transformation matrix, T, for transforming the second chrominance channel of X-hat;
$T_{Li}$=ith element in the first row in a color transformation matrix, T, for transforming the luminance of X-hat;
X-hat$_j^{(n)}$=hypothetical or simulated high-resolution image for the jth color plane in the reference projector frame buffer 120, as defined in Equation XV, for iteration number n;
$T_{C1j}$=jth element in the second row in a color transformation matrix, T, for transforming the first chrominance channel of X-hat;
$T_{C2j}$=jth element in the third row in a color transformation matrix, T, for transforming the second chrominance channel of X-hat;
$T_{Lj}$=jth element in the first row in a color transformation matrix, T, for transforming the luminance of X-hat; and
N=number of color planes.

Equation XXIV may be intuitively understood as an iterative process of computing an error in the reference projector 118 coordinate system and projecting it back onto the sub-frame data. In one embodiment, sub-frame generator 108 (FIG. 8) is configured to generate sub-frames 110 in real-time using Equation XXIV. The generated sub-frames 110 are optimal in one embodiment because they maximize the probability that the simulated high-resolution image 406 (X-hat) is the same as the desired high-resolution image 408 (X), and they minimize the error between the simulated high-resolution image 406 and the desired high-resolution image 408. Equation XXIV can be implemented very efficiently with conventional image processing operations (e.g., transformations, down-sampling, and filtering). The iterative algorithm given by Equation XXIV converges rapidly in a few iterations and is very efficient in terms of memory and computation (e.g., a single iteration uses two rows in memory; and multiple iterations may also be rolled into a single step). The iterative algorithm given by Equation XXIV is suitable for real-time implementation, and may be used to generate optimal sub-frames 110 at video rates, for example.

To begin the iterative algorithm defined in Equation XXIV, an initial guess, $Y_{ik}^{(0)}$, for the sub-frames 110 is determined. In one embodiment, the initial guess for the sub-frames 110 is determined by texture mapping the desired high-resolution frame 408 onto the sub-frames 110. In one embodiment, the initial guess is determined from the following Equation XXV:

$$Y_{ik}^{(0)} = D_i B_i F_{ik}^T X_i \qquad \text{Equation XXV}$$

where:
- k=index for identifying individual sub-frames 110;
- i=index for identifying color planes;
- $Y_{ik}^{(0)}$=initial guess at the sub-frame data for the kth sub-frame 110 for the ith color plane;
- $D_i$=down-sampling matrix for the ith color plane;
- $B_i$=interpolation filter for the ith color plane;
- $F_{ik}^T$=Transpose of operator, $F_{ik}$, from Equation XV (in the image domain, $F_{ik}^T$ is the inverse of the warp denoted by $F_{ik}$); and
- $X_i$=ith color plane of the desired high-resolution frame 408.

Thus, as indicated by Equation XXV, the initial guess ($Y_{ik}^{(0)}$) is determined by performing a geometric transformation ($F_{ik}^T$) on the ith color plane of the desired high-resolution frame 408 ($X_i$), and filtering ($B_i$) and down-sampling ($D_i$) the result. The particular combination of neighboring pixels from the desired high-resolution frame 408 that are used in generating the initial guess ($Y_{ik}^{(0)}$) will depend on the selected filter kernel for the interpolation filter ($B_i$).

In another embodiment, the initial guess, $Y_{ik}^{(0)}$, for the sub-frames 110 is determined from the following Equation XXVI:

$$Y_{ik}^{(0)} = D_i F_{ik}^T X_i \qquad \text{Equation XXVI}$$

where:
- k=index for identifying individual sub-frames 110;
- i=index for identifying color planes;
- $Y_{ik}^{(0)}$=initial guess at the sub-frame data for the kth sub-frame 110 for the ith color plane;
- $D_i$=down-sampling matrix for the ith color plane;
- $F_{ik}^T$=Transpose of operator, $F_{ik}$, from Equation XV (in the image domain, $F_{ik}^T$ is the inverse of the warp denoted by $F_{ik}$); and
- $X_i$=ith color plane of the desired high-resolution frame 408.

Equation XXVI is the same as Equation XXV, except that the interpolation filter ($B_k$) is not used.

Several techniques are available to determine the geometric mapping ($F_{ik}$) between each projector 112 and the reference projector 118, including manually establishing the mappings, or using camera 32 and calibration unit 124 (FIG. 8) to automatically determine the mappings. In one embodiment, if camera 32 and calibration unit 124 are used, the geometric mappings between each projector 112 and the camera 32 are determined by calibration unit 124. These projector-to-camera mappings may be denoted by $T_k$, where k is an index for identifying projectors 112. Based on the projector-to-camera mappings ($T_k$), the geometric mappings ($F_k$) between each projector 112 and the reference projector 118 are determined by calibration unit 124, and provided to sub-frame generator 108. For example, in an image display system 10B with two projectors 112(1) and 112(2), assuming the first projector 112(1) is the reference projector 118, the geometric mapping of the second projector 112(2) to the first (reference) projector 112(1) can be determined as shown in the following Equation XXVII:

$$F_2 = T_2 T_1^{-1} \qquad \text{Equation XXVII}$$

where:
- $F_2$=operator that maps a low-resolution sub-frame 110 of the second projector 112(2) to the first (reference) projector 112(1);
- $T_1$=geometric mapping between the first projector 112(1) and the camera 32; and
- $T_2$=geometric mapping between the second projector 112(2) and the camera 32.

In one embodiment, the geometric mappings ($F_{ik}$) are determined once by calibration unit 124, and provided to sub-frame generator 108. In another embodiment, calibration unit 124 continually determines (e.g., once per frame 106) the geometric mappings ($F_{ik}$), and continually provides updated values for the mappings to sub-frame generator 108.

One form of the single color projector embodiments provides an image display system 10B with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images at high lumen levels, but at lower cost than existing high-resolution projection systems, such as a single, high-resolution, high-output projector. One embodiment provides a scalable image display system 10B that can provide virtually any desired resolution, brightness, and color, by adding any desired number of component projectors 112 to image display system 10B.

In some existing display systems, multiple low-resolution images are displayed with temporal and sub-pixel spatial offsets to enhance resolution. There are some important differences between these existing systems and the single color projector embodiments. For example, in one embodiment, there is no need for circuitry to offset the projected sub-frames 110 temporally. In one embodiment, the sub-frames 110 from the component projectors 112 are projected "in-sync". As another example, unlike some existing systems where all of the sub-frames go through the same optics and the shifts between sub-frames are all simple translational shifts, in one embodiment, the sub-frames 110 are projected through the different optics of the multiple individual projectors 112. In one form of the single color projector embodiments, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment of the single color projector embodiments, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods assume simple shift offsets between projectors, use frequency domain analyses, and rely on heuristic methods to compute component sub-frames. In contrast, one embodiment described herein utilizes an optimal real-time sub-frame generation algorithm that explicitly accounts for arbitrary relative geometric distortion (not limited to homographies) between the component projectors 112, including distortions that occur due to a display surface 116 that is non-planar or has surface non-uniformities. One form of the single color projector embodiments generates sub-frames 110 based on a geometric relationship between a hypothetical high-resolution reference projector 118 at any arbitrary location and each of the actual low-resolution projectors 112, which may also be positioned at any arbitrary location.

One form of the single color projector embodiments provides an image display system 10B with multiple overlapped low-resolution projectors 112, with each projector 112 projecting a different colorant to compose a full color high-resolution image 114 on display surface 116 with minimal color artifacts due to the overlapped projection. By imposing a color-prior model via a Bayesian approach as is done in one embodiment, the generated solution for determining sub-frame values minimizes color aliasing artifacts and is robust to small modeling errors.

Using multiple off the shelf projectors 112 in image display system 10B allows for high resolution. However, if the projectors 112 include a color wheel, which is common in existing projectors, image display system 10B may suffer from light loss, sequential color artifacts, poor color fidelity, reduced bit-depth, and a significant tradeoff in bit depth to add new colors. One embodiment eliminates the need for a color wheel, and uses in its place, a different color filter for each projector 112 as shown in FIG. 11. Thus, in one embodiment, projectors 112 each project different single-color images. By not using a color wheel, segment loss at the color wheel is eliminated, which could be up to a 20% loss in efficiency in single chip projectors. One form of the single color projector embodiments increases perceived resolution, eliminates sequential color artifacts, improves color fidelity since no spatial or temporal dither is required, provides a high bit-depth per color, and allows for high-fidelity color.

Image display system 10B may be very efficient from a processing perspective since, in one embodiment, each projector 112 only processes one color plane. For example, each projector 112 reads and renders only one-fourth (for RGBY) of the full color data in one embodiment.

In one embodiment, image display system 10B is configured to project images that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 10B may be combined or used with other display systems or display techniques, such as tiled displays.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method comprising:
   before forming images with first and second image frames,
      modifying at least a first pixel value in a first portion of the first image frame to create a first difference between the first pixel value in the first image frame and a first pixel value in a first portion of the second image frame that, at least in part, represents a first code, including modifying the first pixel value in the first image frame within a range of pixel values that are substantially visually imperceptible to a viewer when the first and second image frames are displayed; and
   providing the first image frame, with the modified first pixel value, and the second image frame to a display device for display at different times.

2. A program product comprising:
   a program executable by a processing system for causing the processing system to:
      access first and second captured images, the first captured image captured to include at least a portion of a first image that is displayed at a location of a display surface and the second captured image captured to include at least a portion of a second image that is displayed at the location of the display surface; and
      decode a code from a pixel value in the first captured image corresponding to the location and a pixel value in the second captured image corresponding to the location, the code comprising a difference between the pixel value in the first captured image and the pixel value in the second captured image, wherein the difference is substantially visually imperceptible to a viewer when the first and second images are displayed; and
   a non-transitory computer-readable medium for storing the program.

3. The program product of claim 2 wherein the pixel value in the first captured image and the pixel value in the second captured image are one of red values, green values, and blue values.

4. The program product of claim 2 wherein the pixel value in the first captured image and the pixel value in the second captured image are chrominance values.

5. The program product of claim 2 wherein the code is created before and without forming images of first and second image frames.

* * * * *